United States Patent [19]

Takenaga et al.

[11] Patent Number: 5,086,479
[45] Date of Patent: Feb. 4, 1992

[54] INFORMATION PROCESSING SYSTEM USING NEURAL NETWORK LEARNING FUNCTION

[75] Inventors: Hiroshi Takenaga, Ibaraki; Yoshiyuki Okuyama, Hitachi; Masao Takatoo, Katsuta; Kazuyoshi Asada, Hitachi; Norio Tanaka, Hitachi; Tadaaki Kitamura, Hitachi; Kuniyuki Kikuchi, Hitachiota, all of Japan.

[73] Assignee: Hitachi, Ltd., Tokyo, Japan

[21] Appl. No.: 544,870

[22] Filed: Jun. 28, 1990

[30] Foreign Application Priority Data

Jun. 30, 1989 [JP] Japan ................................. 1-166675
Feb. 21, 1990 [JP] Japan ................................. 2-038376

[51] Int. Cl.⁵ .............................................. G06K 9/00
[52] U.S. Cl. ..................................... 382/14; 382/15; 395/22; 395/23
[58] Field of Search .................. 382/14, 15; 364/513

[56] References Cited

U.S. PATENT DOCUMENTS

| | | | |
|---|---|---|---|
| 4,805,225 | 2/1989 | Clark | 382/15 |
| 4,876,731 | 10/1989 | Loris et al. | 382/15 |
| 4,912,647 | 3/1990 | Wood | 364/513 |
| 4,965,725 | 10/1990 | Rutenberg | 382/15 |

FOREIGN PATENT DOCUMENTS 63-304381 12/1988 Japan.
2-33687 2/1990 Japan.

OTHER PUBLICATIONS

Mobile Robot Control by a Structured Hierarchical Neural Network, by Nagata et al., pp. 69-76, 1989.

Primary Examiner—Leo H. Boudreau
Attorney, Agent, or Firm—Antonelli, Terry, Stout & Kraus

[57] ABSTRACT

An information processing apparatus using a neural network learning function has, in one embodiment, a computer system and a pattern recognition apparatus associated with each other via a communication cable. The computer system includes a learning section having a first neural network and serves to adjust the weights of connection therein as a result of learning with a learning data signal supplied thereto from the pattern recognition apparatus via the communication cable. The pattern recognition apparatus includes an associative output section having a second neural network and receives data on the adjusted weights from the learning section via the communication cable to reconstruct the second neural network with the data on the adjusted weights. The pattern recognition apparatus with the associative output section having the reconstructed second neural network performs pattern recognition independently of the computer system with the communication cable being brought into an electrical isolation mode.

17 Claims, 23 Drawing Sheets

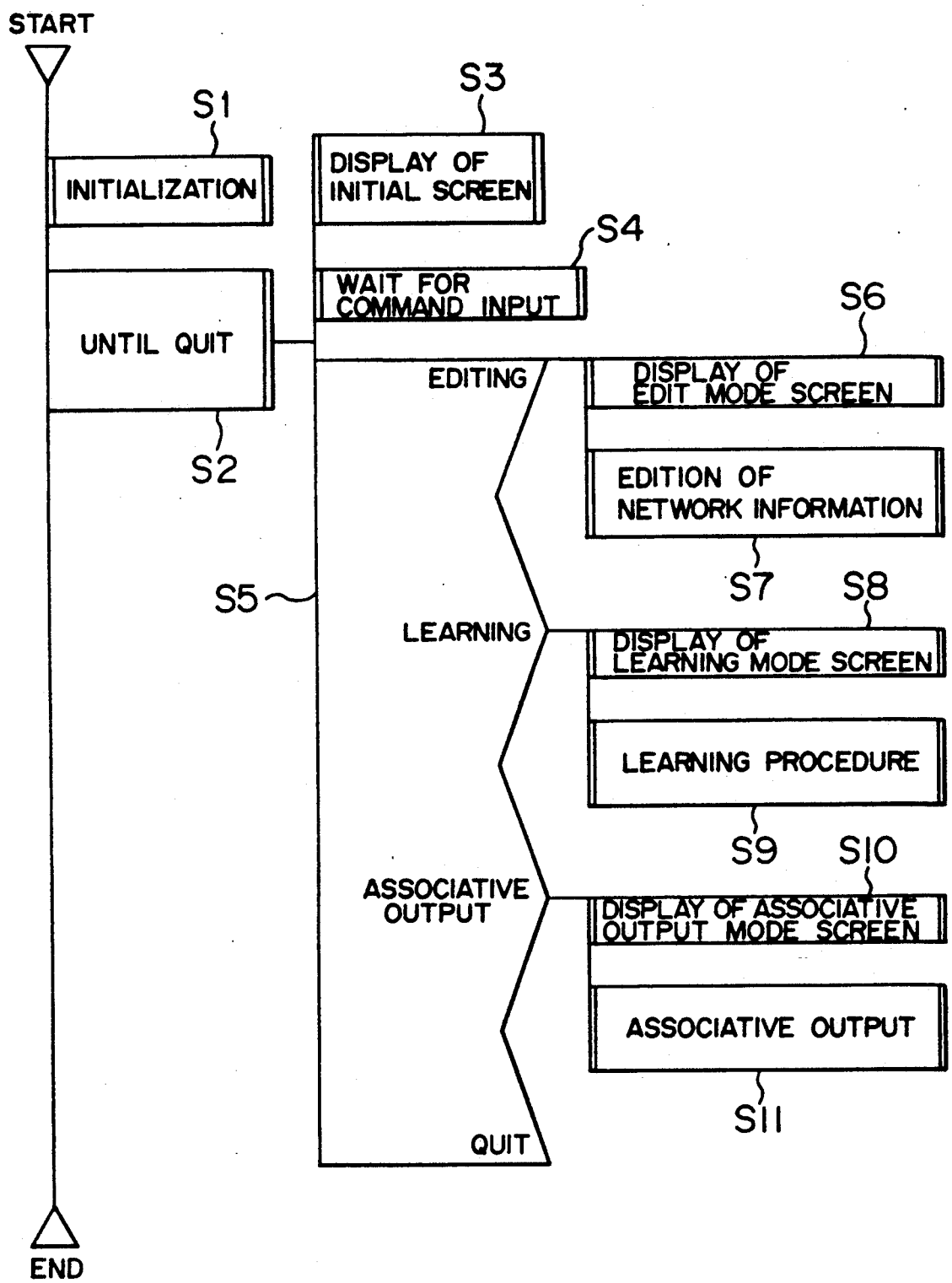

FIG. 13

| | |
|---|---|
| C1 | NAME OF NEURAL NETWORK |
| C2 | TYPE OF NETWORK |
| C3 | UPPER LIMIT OF NUMBER OF TIMES OF REPETITION OF LEARNING OPERATIONS |
| C4 | LEARNING CONSTANTS |
| C5 | STABILIZATION CONSTANTS |
| C6 | METHOD OF SETTING INITIAL WEIGHTS |
| C7 | INITIAL WEIGHTS |
| C8 | INITIAL THRESHOLD |
| C9 | CONVERGENCE DISCRMINATION CONDITIONS |
| C10 | NUMBER OF LAYERS |
| C11 | NUMBER OF NEURONS FOR 1ST LAYER |
| C12 | NUMBER OF NEURONS FOR 2ND LAYER |
| ⋮ | ⋮ |
| C1i | NUMBER OF NEURONS FOR i-TH LAYER |

FIG. 15

```
                                       COMMAND INPUT COLUMN COL
┌─────────────────────────────────────────────────────────────┐
│ ┌──────┬──────┬──────┬──────────────────────┬──────┬──────┐ │
│ │      │      │ASSOCI│                      │      │      │ │
│ │ EDIT │ LEARN│ATIVE │   1. NETWORK EDITION │ RUN  │ QUIT │ │
│ │      │      │OUTPUT│                      │      │      │ │
│ └──────┴──────┴──────┴──────────────────────┴──────┴──────┘ │
```

1. NAME OF NEURAL NETWORK =

2. INPUT MODE = KEYBOARD / FILE / EXTERNAL UNIT

3. PRINT OUTPUT = NO / YES

4. NETWORK DISPLAY = NO / YES

---

NAME OF NEURAL NETWORK :

TYPE OF NETWORK :

UPPER LIMIT OF NUMBER OF TIMES OF REPETITION OF LEARNING OPERATIONS :

LEARNING CONSTANTS :

STABILIZATION CONSTANTS :

METHOD OF SETTING INITIAL WEIGHTS :

INITIAL WEIGHTS :

INITIAL THRESHOLD :

CONVERGENCE DISCRIMINATION CONDITIONS :

NUMBER OF LAYERS :

NUMBER OF NEURONS FOR 1ST LAYER :

NUMBER OF NEURONS FOR 2ND LAYER :

⋮

NUMBER OF NEURONS FOR n-TH LAYER :

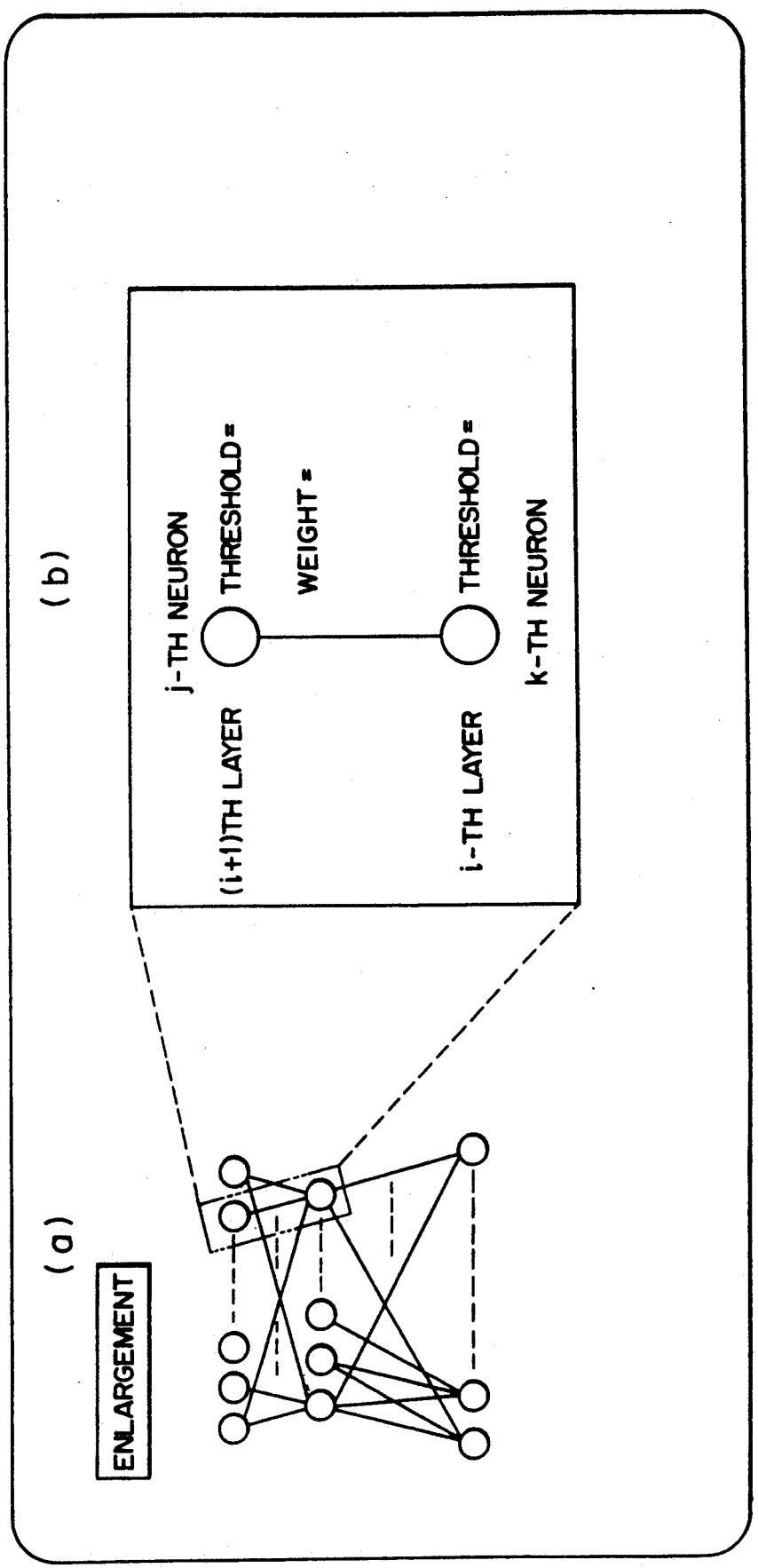

FIG. 17

| EDIT | LEARN | ASSOCIATIVE OUTPUT | TRANSFER | RUN | QUIT |

COMMAND INPUT COLUMN COL

1. NAME OF NEURAL NETWORK =    2. LEARNING DATA PRODUCTION
2. INPUT MODE = KEYBOARD/USER APPLICATION
3. PRINT OUTPUT = NO/YES

NAME OF NETWORK :
NUMBER OF LEARNING DATA :
NUMBER OF NEURONS FOR INPUT LAYER :
NUMBER OF NEURONS FOR OUTPUT LAYER :

```
10  0.5   0.2   0.7   0.3   0.1
    ...
    0.95  0.01  0.01  0.01  0.01
11
                                   INPUT DATA    ⎫
                                                 ⎬ LEARNING DATA
                                   TEACHERS DATA ⎭
t                                  INPUT AREA
```

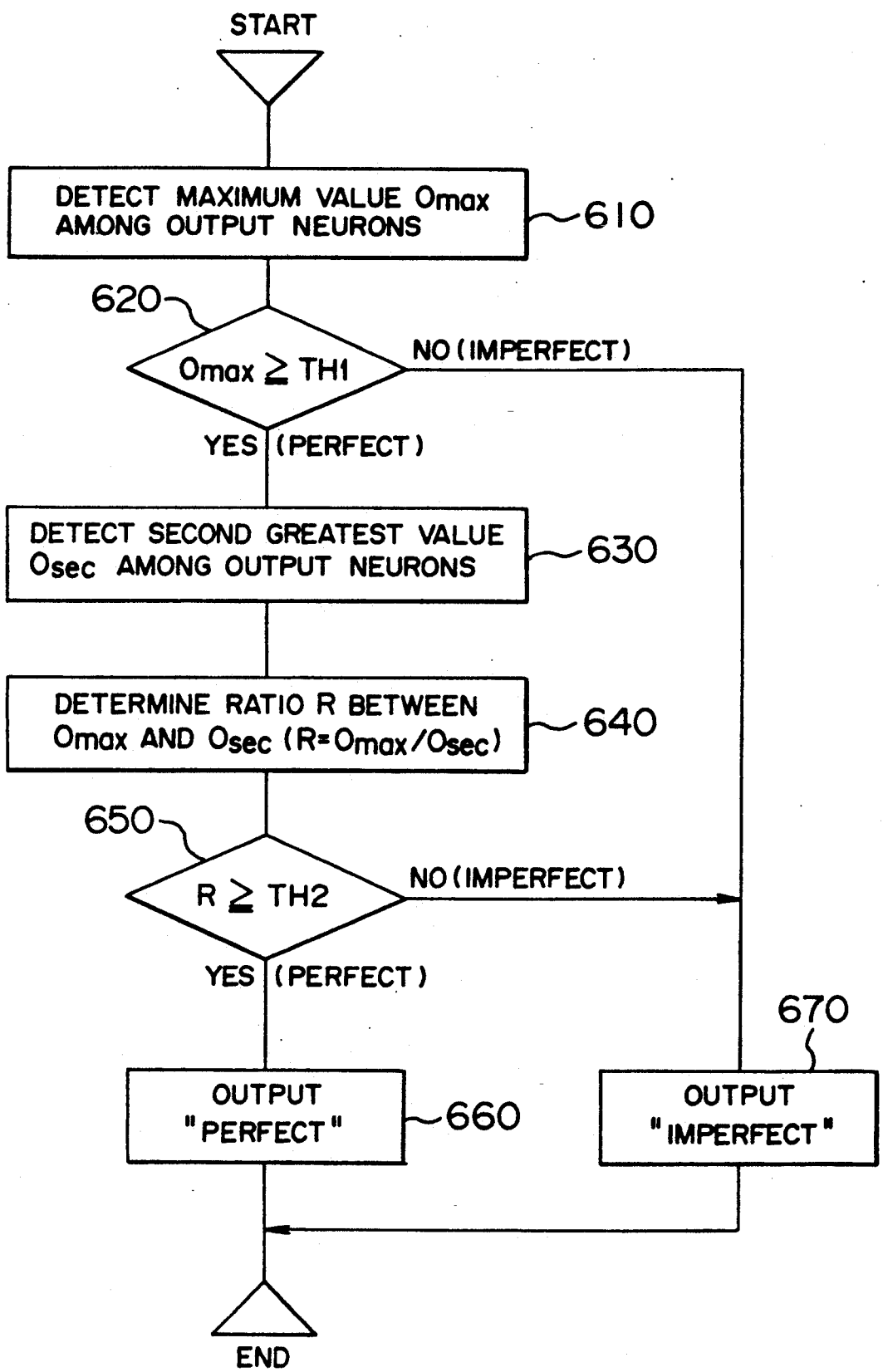

INFORMATION PROCESSING SYSTEM USING NEURAL NETWORK LEARNING FUNCTION

BACKGROUND OF THE INVENTION

The present invention relates to an information processing system using a neural network learning function. A specific example of such an information processing system includes a pattern recognition system using a neural network learning function.

A neural network simulating the neural network in the brain has such a capability that simply by teaching the network an input data and an expected output value (hereinafter referred to as "the teacher's data") of the network against the particular input data, a recognition algorithm for discriminating and classifying the data into a predetermined category is constructed. This capability has actively promoted an application to the fields of pattern recognition such as image and voice recognitions. Especially in image recognition, however, a great problem has been posed by the requirement for an image-processing expert to develop a recognition algorithm by a heuristic technique each time an object to be recognized changes. If a neural network is used, all that is necessary is to teach the neural network an object of application, and therefore it is possible to simplify and shorten the time for the development of a recognition algorithm.

The conventional neural network system, in a personal computer or a work station, comprises a neural network definition section for defining the construction (number of layers, number of neurons of each layer, etc.) of the neural network and an operating section for producing an associative output having a learning or learned neural network using a learning data (a combination of an input data and a teacher's data) read from a keyboard or a file. Systems of this type are described, for example, in Technical Report PRU 88-58, Sept. 16, 1988, pp. 79-86, The Institute of Electronics, Information and Communication Engineers of Japan and in Nikkei Computer, Mar. 14, 1988, p. 14.

The conventional neural network system, configured of a section for defining the structure of a neural network and an operating section for learning and producing an associative output, lacks full consideration of the preparation of the learning data and application of the learning data to the neural network (for example, it is required that an operating section for learning and producing an associative output be provided for each of the applications such as image and voice recognition, a learning data being supplied to the operating section) in a specific application of the prior art to image recognition or the like. Also, the learning function is redundant in applications to a practical system.

SUMMARY OF THE INVENTION

An object of the present invention is to provide an information processing system using a neural network learning function, in which different learning data are easily produced and applied to neural networks for different applications, and the learning is carried out efficiently thereby to facilitate application of the information processing system to a practical system.

According to one aspect of the present invention, as information processing apparatus using a neural network learning function has a first operating apparatus (for example, a computer system) and a second operating apparatus (for example, a pattern recognition apparatus) associated with each other via a communication medium (for example, a communication cable). The computer system includes a learning section having a first neural network means and serves to adjust the weights of connection therein as a result of learning with a learning data signal supplied thereto from the pattern recognition apparatus via the communication cable. The pattern recognition apparatus includes an associative output section having a second neural network means and receives data on the adjusted weights from the learning section via the communication cable to reconstruct the second neural network means with the data on the adjusted weights. The pattern recognition apparatus with the associative output section having the reconstructed second neural network means performs pattern recognition independently of the computer system with the communication cable being brought into an electrical isolation mode.

According to another aspect of the present invention, a learning section including neural network means is realized by a computer system such as a personal computer or work station on the one hand, and a learning data producing section used for learning by the neural network means and an associative output section including another neural network means reconstructed by the learning, are realized by a pattern recognition system such as an image or voice recognition system on the other hand. Also, the whole or part of the functions of defining and editing the structure of the neural network means (number of layers, number of neurons for each layer, etc.) and monitoring of the learning conditions of the neural network are realized by the neural network management sections of the computer system and the voice recognition system. Further, each of the computer system and the pattern recognition system is provided with a communication section to connect them by a communication cable.

The neural network management section in the pattern recognition means produces the information on the neural network structure in accordance with the object for recognition (numerals, alphanumeric characters, voice, etc.) handled by the pattern recognition system. In the next step, the learning data producing section extracts data (input data) required for learning from the object for recognition and produces the learning data with a teacher's data indicating the category of the object for recognition as a pair. After that, the neural network management section transfers the information on the neural network structure and the learning data produced at the learning data producing section to the computer system through the communication section and the communication cable.

On the computer system side, on the other hand, the neural network management section delivers the information on the neural network structure and the learning data sent thereto to the learning section. The learning section learns these data, and by computing weights of connection between neurons, reconstructs a neural network suitable for the object for recognition. In the process, the neural network management section may indicate a change in the weights or the number of learnings.

Upon completion of a learning, the neural network management section transfers the weights between neurons determined at the learning section to the pattern recognition means through the communication section and the communication cable.

Next, the associative output section implemented in the pattern recognition means discriminates and classifies the object for recognition by use of the information on the neural network construction produced at the neural network management section and the weights transferred thereto from the computer system.

Since each part may operate in the manner mentioned above, in the case of learning at the neural network, the speed of learning may be increased by connecting the pattern recognition apparatus and the computer system by communication line on the one hand, and upon completion of the learning, the computer system may be isolated from the pattern recognition apparatus to realize a low-cost practical system with a pattern recognition apparatus adapted for independent operation on the other hand.

BRIEF DESCRIPTION OF THE DRAWINGS

FIG. 10 is a diagram showing a flowchart of operation according to an embodiment of the present invention.

FIG. 13 is a diagram showing a structure information of a neural network usable according to the present invention.

FIG. 15 is a diagram showing a screen in neural network edit mode related to FIG. 12.

FIG. 16 is a diagram showing an example of display of a neural network related to FIG. 15.

FIG. 17 is a diagram showing a screen in learning data production mode related to FIG. 12.

FIG. 25 is a flowchart showing a sequence of operation of the control section in FIG. 23.

DESCRIPTION OF THE PREFERRED EMBODIMENTS

Figure 1:
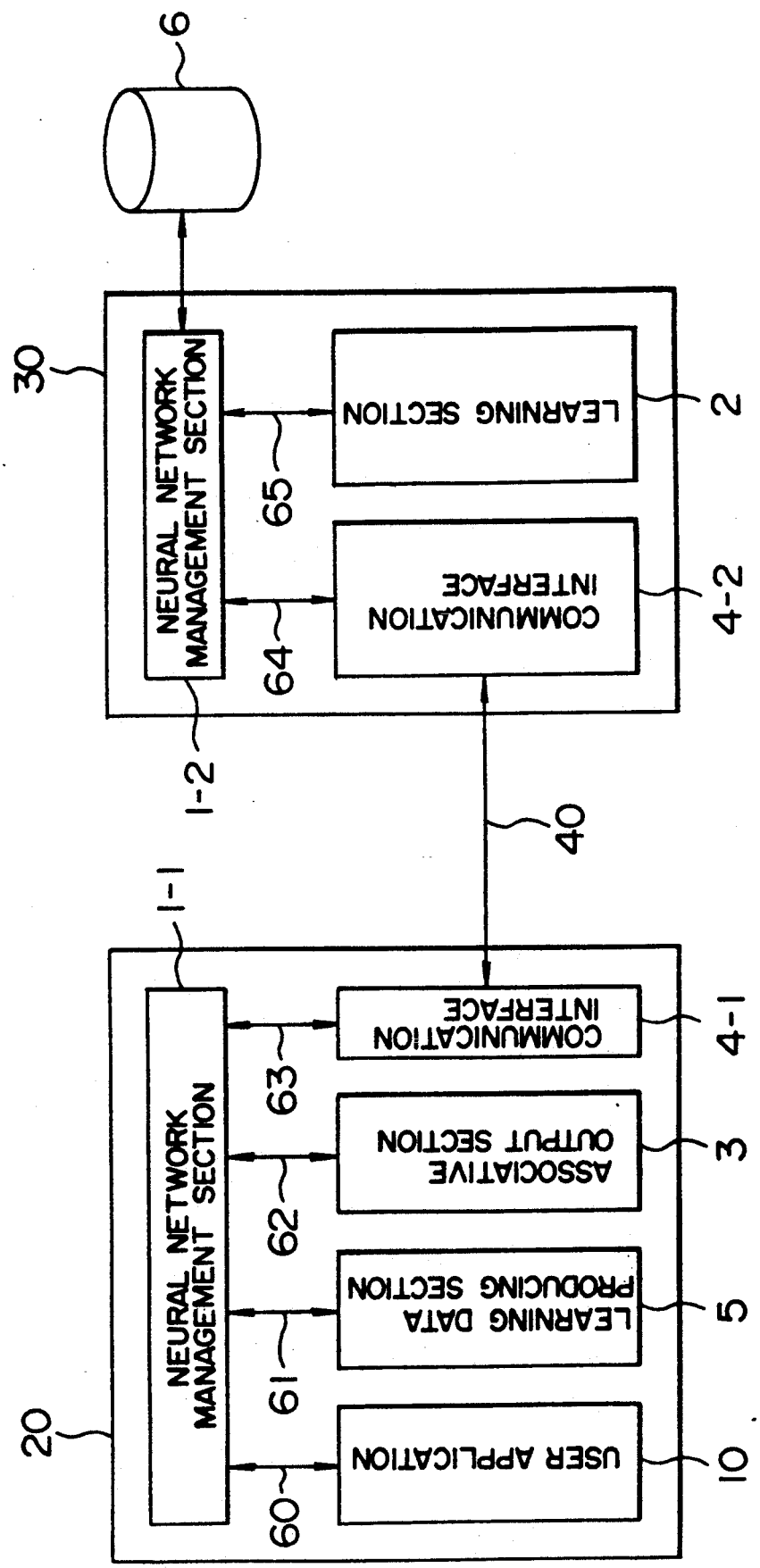
FIG. 1 is a block diagram showing an information processing system according to an embodiment of the present invention.

With reference to FIG. 1, an information processing system comprises a first operating means 20 (a pattern recognition apparatus in this case) and a communication medium 40 (a communication cable in this case) making up a second operating means 30 (a computer system in this case) connected to the first operating means. The pattern recognition apparatus 20 includes a user application 10 serving as an input signal source section for supplying at least one of a learning input signal and a pattern input signal representing a pattern to be recognized, a learning data producing section 5 for producing a learning data signal from a learning input signal from the user application 10 and a learning data signal from a teacher's data signal, an associative output section 3 including neural network means, a communication interface 4-1 for effecting transference/ receiving of data and information to and from the computer system 30 through the communication cable 40, and a neural network management section 1—1. The computer system 30 includes a learning section 2 having another neural network means for receiving a learning data signal from the learning data producing section through the communication cable 40 and effecting the learning by means of the learning data signal thus received, a communication interface 1-2 for transferring to or receiving from the pattern recognition apparatus 20 data or information through the communication cable, and another neural network management section 1-2. The communication interfaces 4-1, 4-2 may be configured of, for example, a plurality of registers combined.

The learning section 2 further has weight adjusting means for executing learning. The weight adjusting means may be implemented by a program incorporated into a microprocessor constituting the computer system 30. The neural network means has a function of holding data on the adjusted weights.

The reference numeral 6 designates a recording medium such as hard disk or floppy disk. The arrows 61, 62, 63, 64 and 65 shown by solid lines in FIG. 1 designate flows of data such as the learning data and the structure information of the neural networks.

FIG. 1 shows a configuration in which among the fundamental functions essential to an information processing system using the neural network learning function, the functions of the learning data producing section 5 and the associative output section 3 are distributed to the pattern recognition apparatus 20, and that of the learning section 2 to the computer system 30, with the pattern recognition apparatus 20 and the computer system 30 connected by the communication cable 40.

In this configuration, (1) the learning phase and (2) the utility phase described below are readily realized by connecting and disconnecting the pattern recognition apparatus 20 and the computer system 30 by means of the communication cable 40.

(1) Learning phase: A phase in which a neural network suitable for the application 10 of the pattern recognition apparatus 20 is constructed by learning at the learning section 2 of the computer system 30. In this case, the pattern recognition apparatus 20 and the computer system 30 are electrically connected to each other by the communication cable 40 in connecting operation mode. On the basis of the learning input signal, produced by the user application 10 and the teacher's data signal supplied from the user application 10 or an external source, a learning data signal is produced at the learning data producing section 5 in the pattern recognition apparatus 20, and the learning data signal thus produced is transferred from the communication interface 4—1 through the communication cable 40 to the communication interface 4—2 in the computer system 30 under the control of the management section 1—1. The communication interface 4—2 sends the learning data signal thus transferred thereto to the neural network management section 1—2. The neural network management section 1—2, in turn, manages the learning data and supplies a learning data signal to the learning section 2. The weights determined after learning at the learning section 2 are transferred to the pattern recognition apparatus 20 through the communication interface 4—2 and the communication cable 40 upon the transfer request issued from the neural network management section 1—2 to the communication interface 4—2.

(2) Utility phase: A phase in which the communication cable 40 is set to the independent operation mode for separating the apparatus 20 from the system 30 electrically, so that the pattern recognition apparatus 20 produces an associative output at the neural network means of the associative output section 3 and effects recognition at the user application 10 by use of the weights transferred thereto in the learning phase (1) independently of the operation of the computer system 30.

Figure 3:
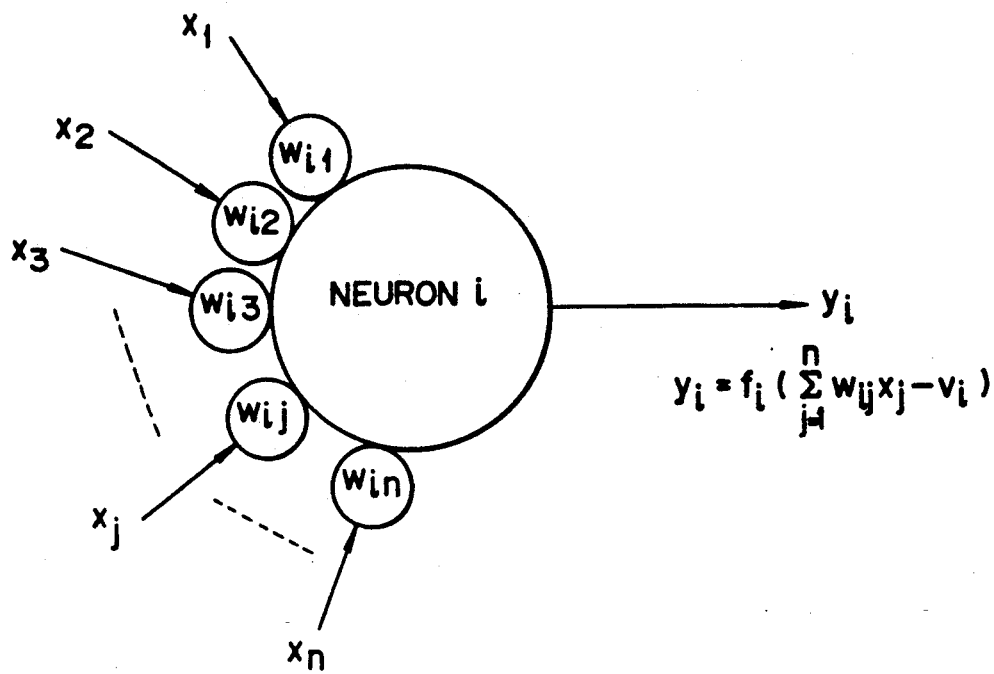
Figure 4:
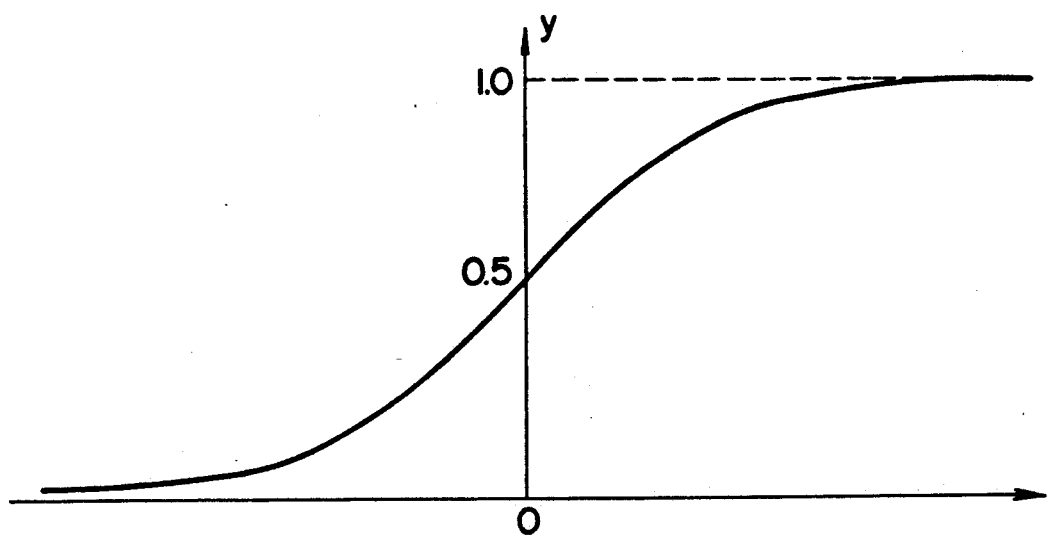

Now, explanation will be made about a layered-structure neural network with reference to FIGS. 2 to 4 as an example of configuration of the neural network means included in the associative output section 3 and the learning section 2 shown in FIG. 1. It is, however, obvious that a neural network of another structure may also be used with equal effect according to the present invention.

Figure 2:
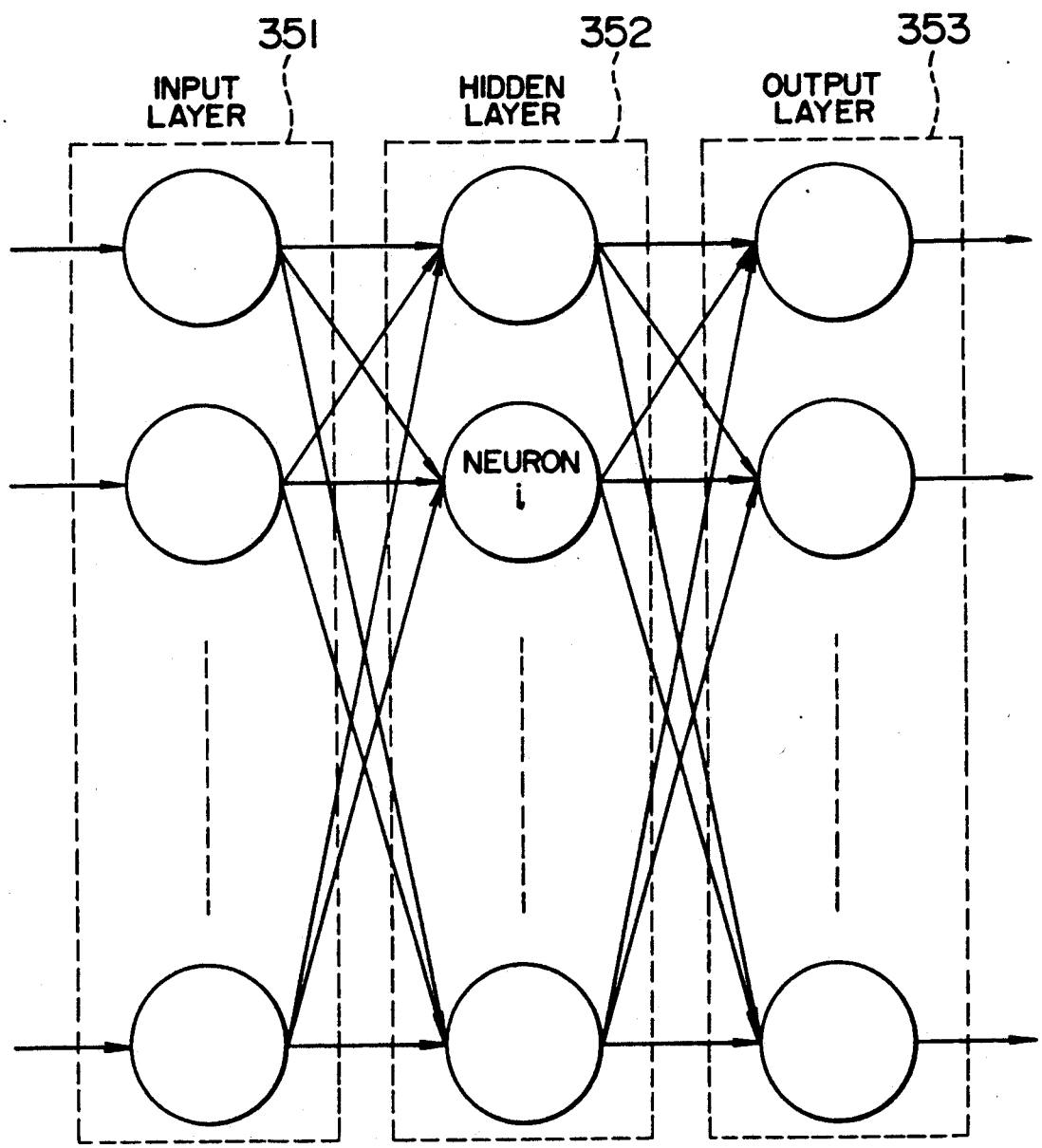
FIGS. 2 to 4 are diagrams showing an example of configuration of a neural network.

The neural network of a multi-layered structure type, as shown in FIG. 2, is composed of three layers including an input layer 351, a hidden layer 352 and an output layer 353, which are combined unidirectionly from the input layer toward the output layer. Each layer is comprised of single-function operators called neurons (neurons i in the hidden layer 320, for example). These neurons will be explained with reference to FIG. 3, showing the neurons i in detail. As shown in FIG. 3, each of the operators is an element having multiple inputs and a single output, which determines a sum-of-products of each input $x_{ij}$ and a corresponding weight $w_{ij}$, and the result is converted into a function $f_i$ to produce an output $y_i$ (as the related equation is shown in the drawing). The function $f_i$ is a non-linear one called the Sigmoid function. In the process, the output value of the neurons ranges from 0 to 1. The output approaches 1 with the increase in input value, and 0 with the decrease in input value.

The learning section 2 in FIG. 1 determines the weights $w_{ij}$ of the neurons by learning. The learning is implemented by a back-propagation method (See "Learning Representations by Back-Propagation Errors", by Rumelhart, D. E., Hinton, G. E. and Williams, R. J., pp. 533-536 Nature, Vol. 323, October 1986; and "A Neural Network Used for Pattern Recognition, Signal Processing and Knowledge Processing", pp. 115-123 Nikkei Electronics, No. 472, August 1987).

Figure 5:
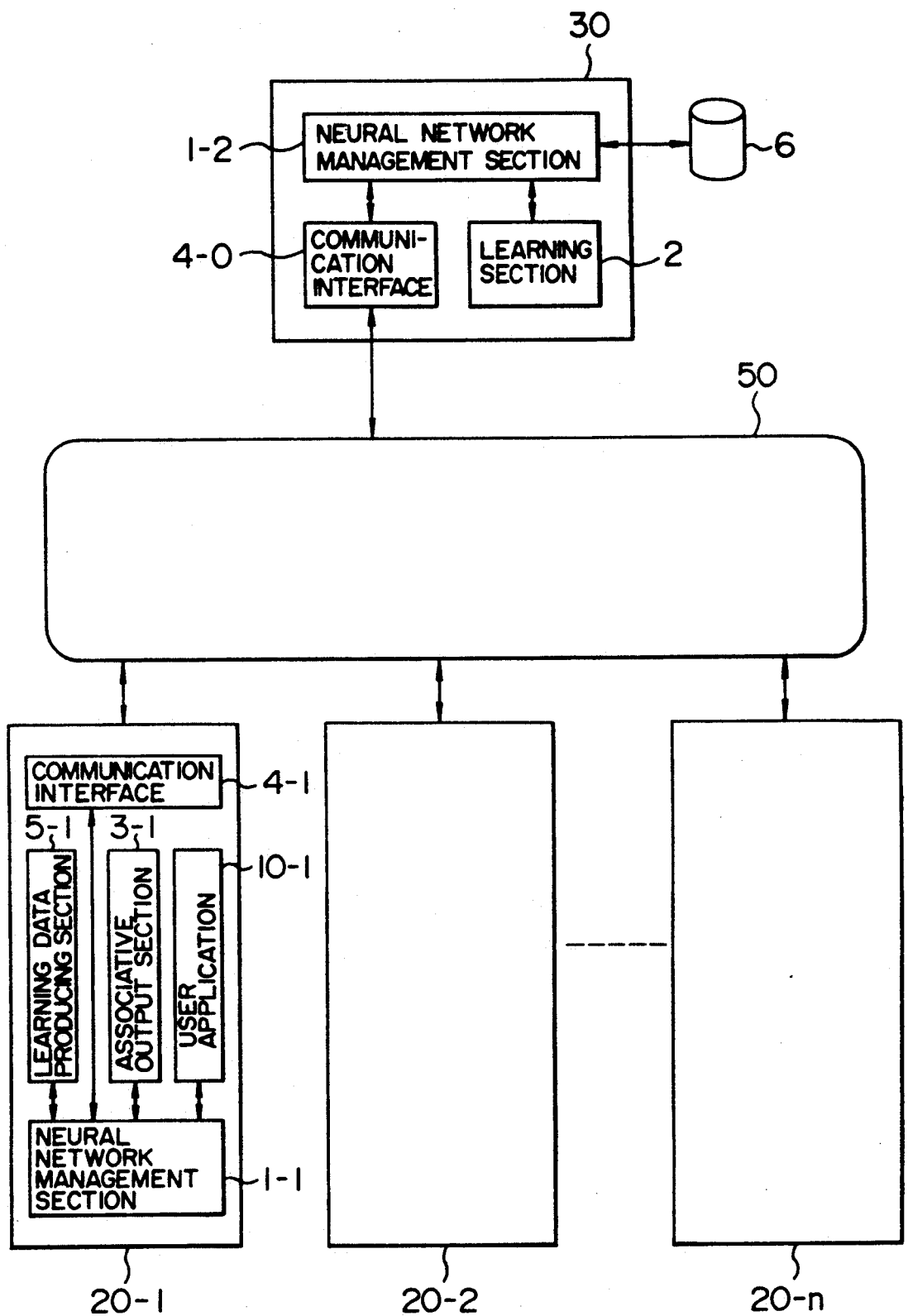
FIG. 5 is a diagram showing a configuration of an information processing system on an increased scale according to an embodiment of the present invention.

The configuration shown in FIG. 1 makes possible both an increased speed of learning and a reduced cost of a practical system at the same time. Further, apart from FIG. 1 showing a one-to-one connection of the pattern recognition apparatus 20 and the computer system 30, a single function defining apparatus such as the computer system 30 may alternatively be connected with a number n of information processing units such as the pattern recognition apparatuses 20-1 to 20-n by the communication network 50 to configure a large-scale function distribution system as shown in FIG. 5. The information processing function of each information processing unit is defined by applying a learning data signal therefrom to a function defining apparatus, receiving from the function defining apparatus the weight data produced by learning at the function defining apparatus, and reconstructing a neural network of each information processing unit.

Figure 6A:
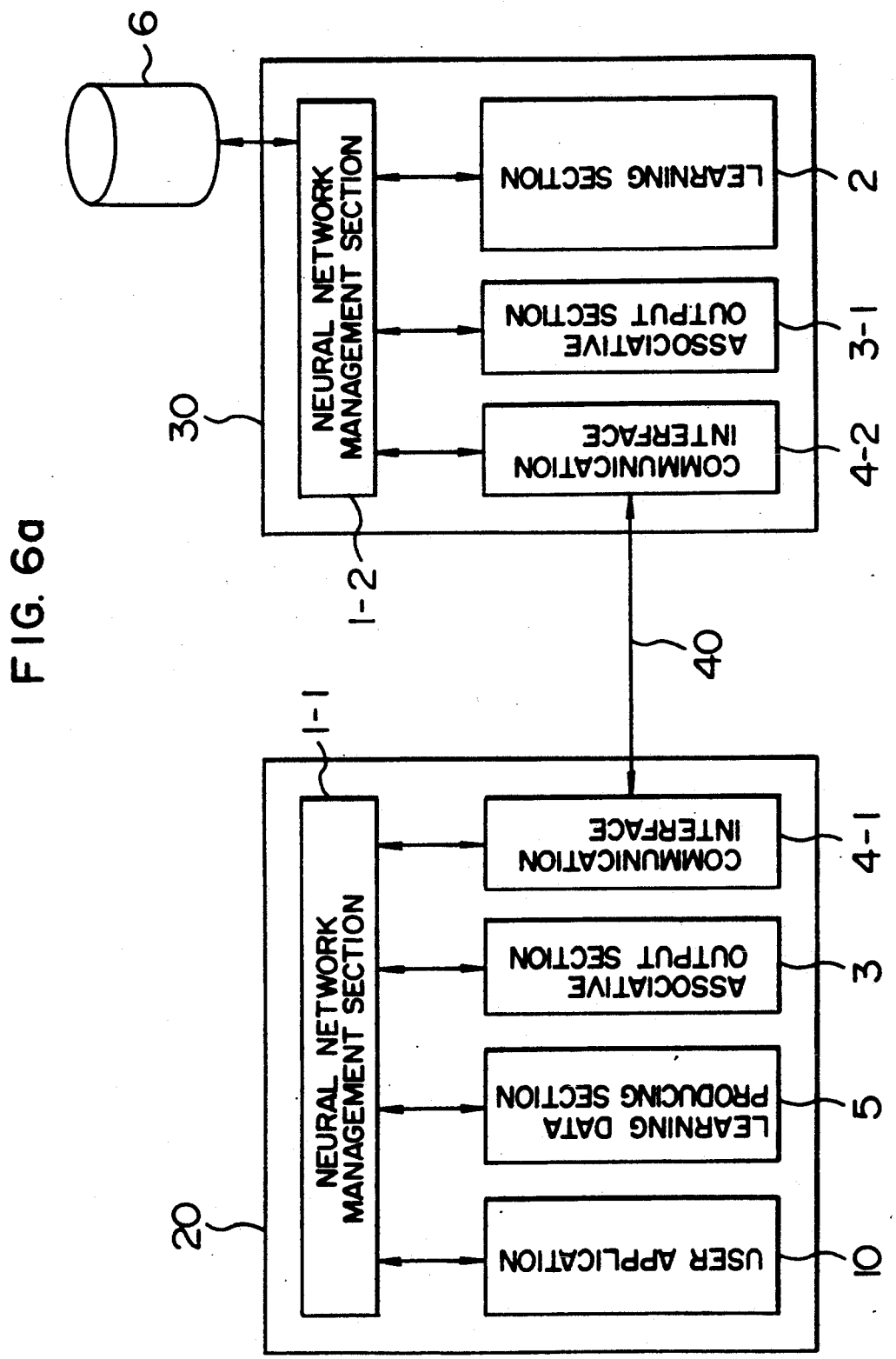
FIGS. 6a and 6b are block diagrams showing information processing systems according to another embodiment of the present invention.
Figure 6B:
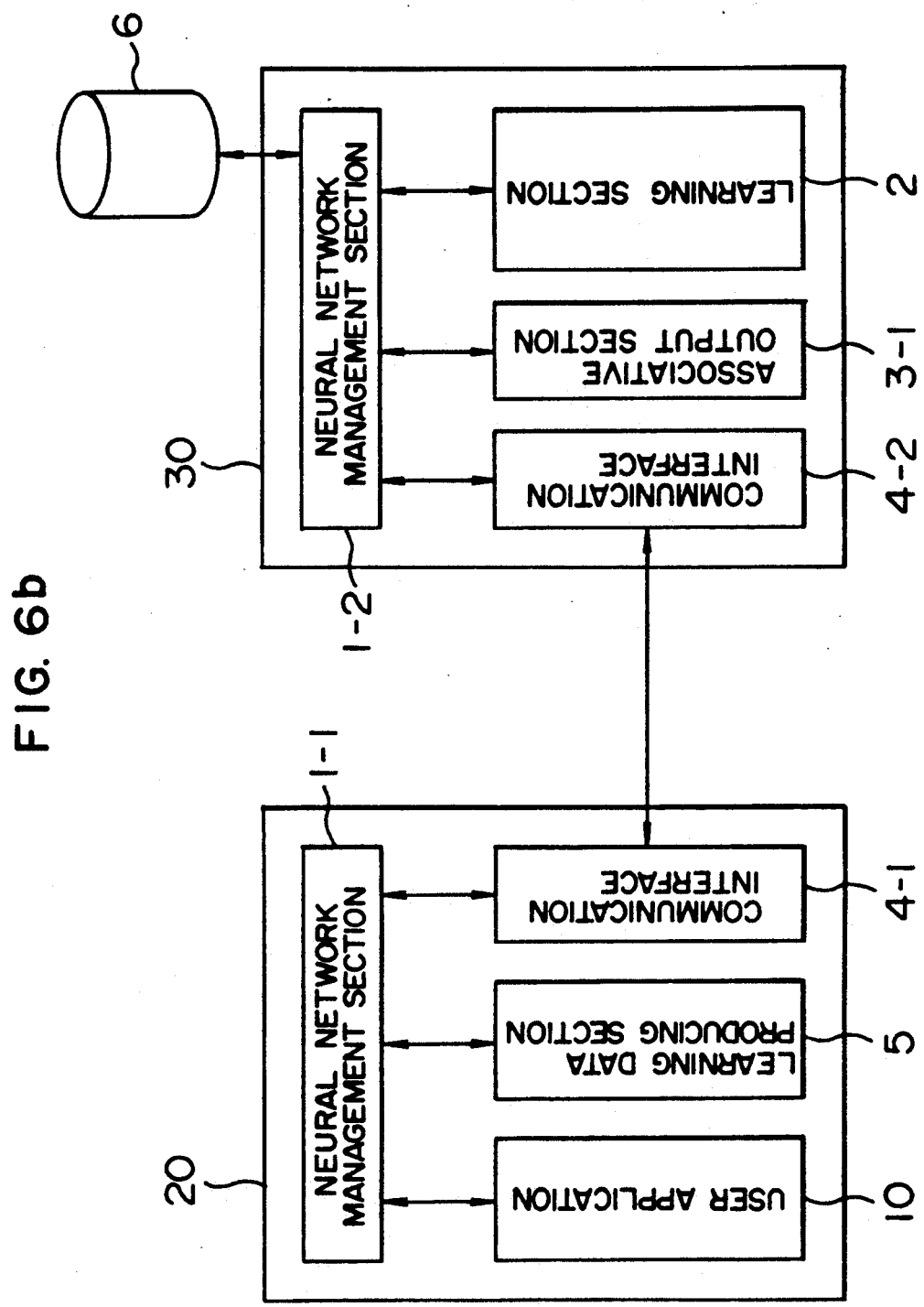
Figure 20:
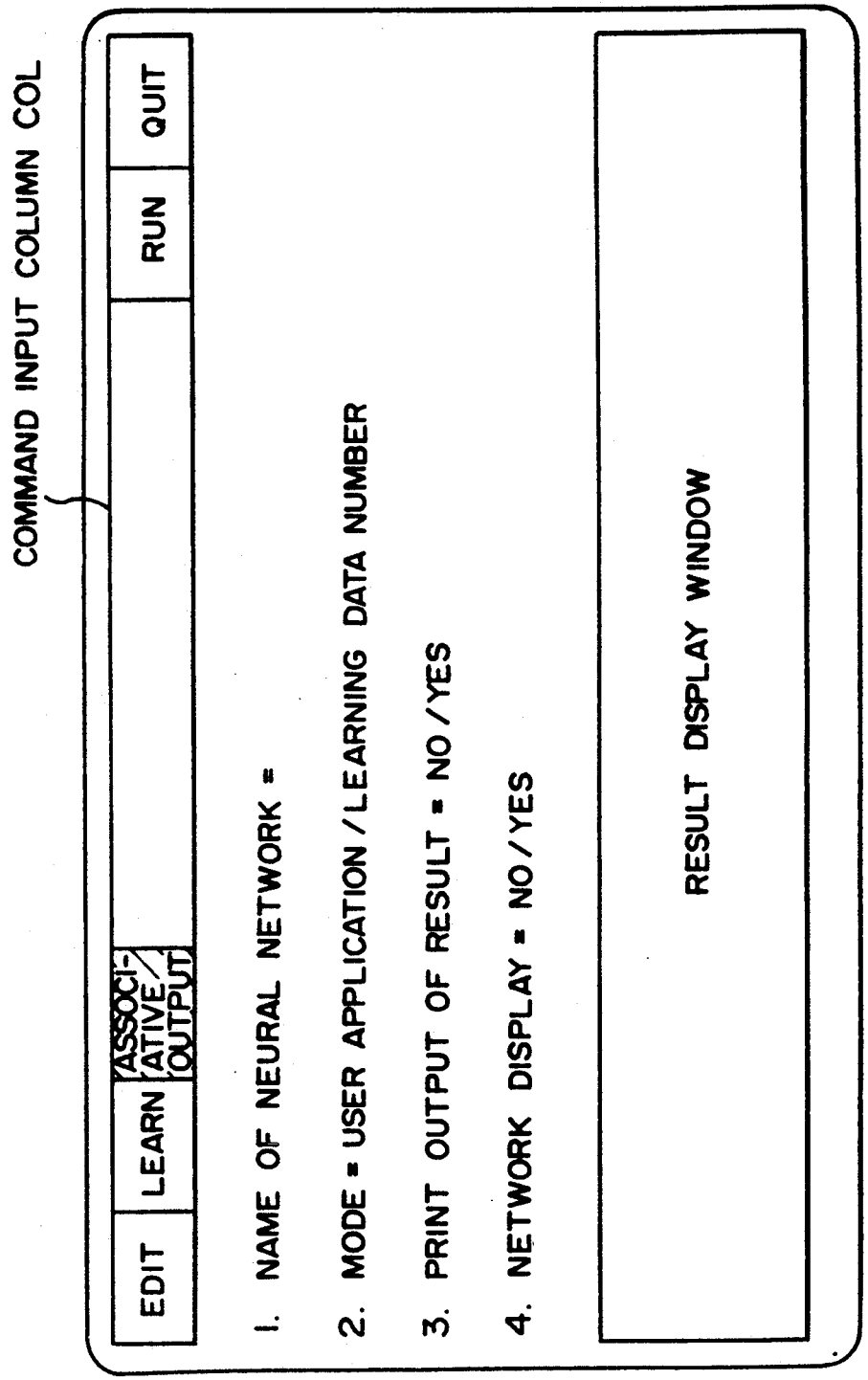
FIG. 20 is a diagram showing an initial screen in associative output mode in FIG. 11.

Also, the method of function distribution configured in FIG. 1 may be replaced by the one shown in FIGS. 6a and 6b, for instance, with equal effect. FIG. 6a shows a configuration of FIG. 1 further comprising an associative output section 3-1 added to the computer system 30 to permit production of an associative output by use of a learned neural network also in the computer system 30. FIG. 6b, on the other hand, shows a configuration in which the associative output section 3 in the pattern recognition apparatus 20 of FIG. 20 is realized on the computer system 30 side. In this configuration, an associative output is also produced by the computer system 30, and the result thereof alone is transferred to the pattern recognition apparatus 20. This configuration makes it possible to increase the processing speeds of both learning and associative output production, although the computer system 30 cannot be separated from the pattern recognition apparatus 20.

Figure 7:
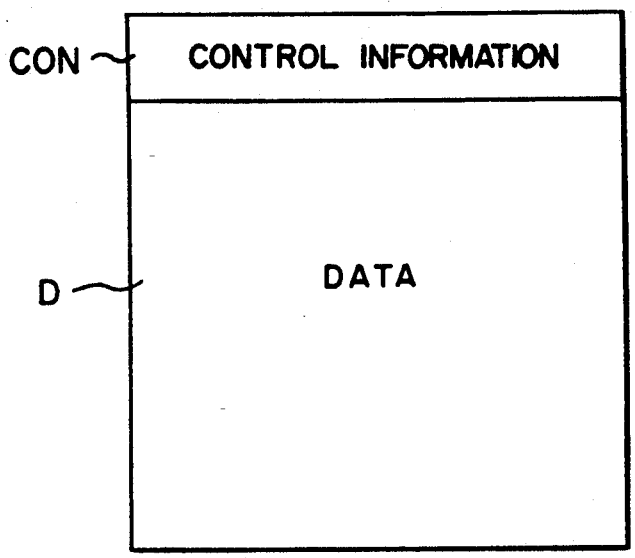
FIG. 7 is a diagram showing a data format usable according to the present invention.
Figure 8:
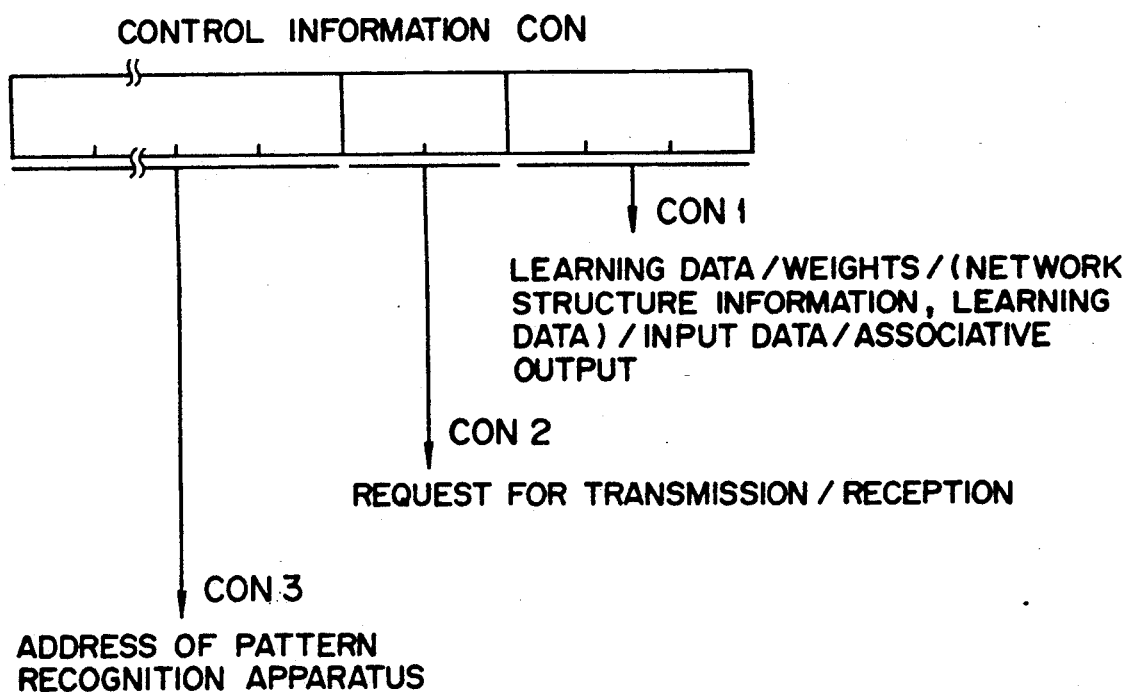
FIG. 8 is a diagram showing an example of the contents of the control information of FIG. 7.

In order to realize the system forms shown in FIGS. 1, 5 and 6a, 6b, the pattern recognition apparatus 20 and the computer system 30 exchange data in accordance with the transfer format shown in FIG. 7. The transfer format includes control information CON and data D.

In FIG. 7, the control information CON may include a data type CON1, a transference/receiving request CON2 or an address CON3 assigned to the pattern recognition apparatus. The data D may take one of the four types shown in FIGS. 9a to 9e shown, for example.

Figure 9A:
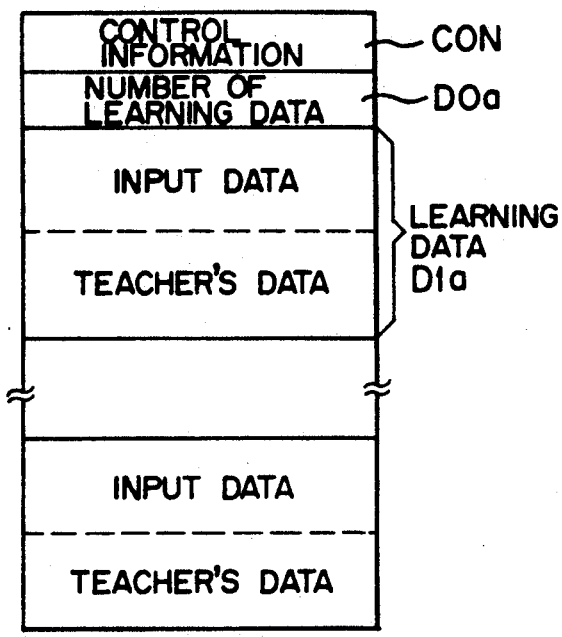
FIGS. 9a to 9e are diagrams showing specific examples of FIG. 8.
Figure 9B:
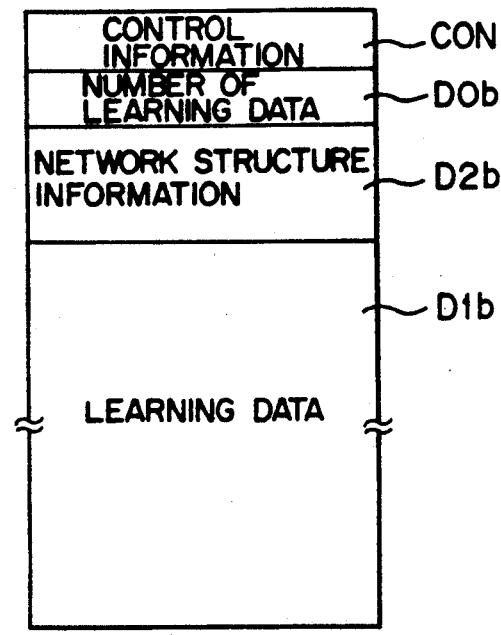
Figure 9C:
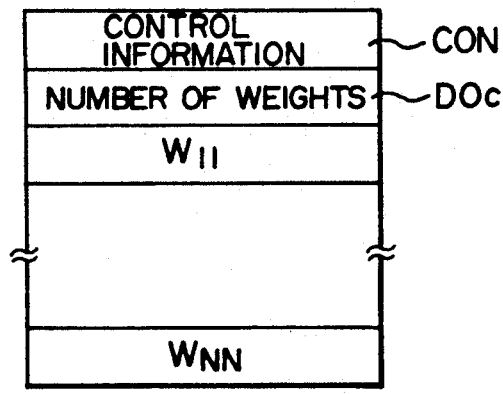

FIG. 9a shows a format used for transferring the weights of the neural network to the pattern recognition apparatus 20 after learning by the computer system 30 with the learning data. A destination pattern recognition apparatus to which data D having a format shown in FIG. 9b will be transferred is one determined by the address CON3 written in the control information. D0c designates the number of weights.

Figure 9D:
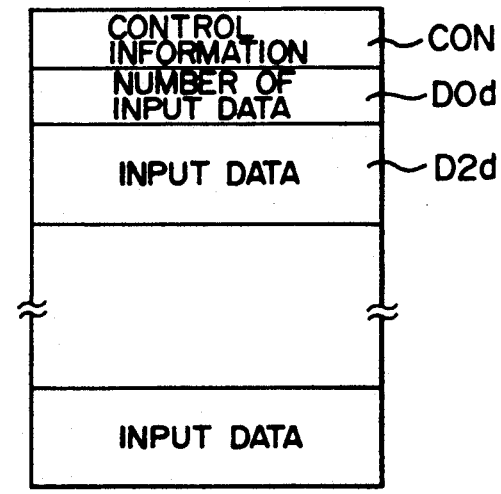

FIG. 9d is a diagram showing a format used for transferring the input data D2d required for associative output and produced at the user application 10, to the associative output section. D0d represents the number of the input data D2d.

Figure 9E:
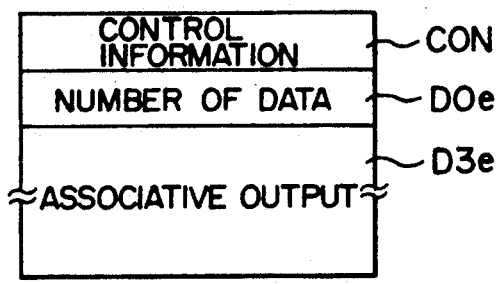

Finally, FIG. 9e shows a format used for transferring to the pattern recognition apparatus 20 the result D3e of associative output based on the input data sent in FIG. 9d as in the configuration of FIG. 6b. D0e designates the number of data contained in the result of associative output.

Now, the manner in which the structure information of the neural network and the learning data which are of special importance to the data shown in FIGS. 9a to 9e are produced, will be explained with reference to the system configuration of FIG. 1.

In FIG. 1, the pattern recognition apparatus 20 and the computer system 30 are managed by the neural network management sections 1-1, 1-2, respectively, which control the associative output section 3, the learning data producing section 5 and the communication interface 4-1, and the learning section 2 and the communication interface 4-2 on the one hand, and executes the functions of a man-machine interface such as the monitoring of the progress of learning and the edition of the structure of the neural network interactively on the other hand. The neural network management section 1—1 (1-2) may be implemented, for example, in the form of a program incorporated into an operation system such as a microprocessor which may constitute the pattern recognition apparatus 20 (computer system 30). All the functions mentioned above need not be realized by the neural network management sections 1—1 and 1-2, but the neural network management section 1—1 of the pattern recognition apparatus 20 may lack the function of monitoring the progress of learning. In view of the fact that the provision of the functions in modules permits a configuration of the neural network management sections 1—1, 1-2 by selectively determining the required functions, however, the explanation that follows will be centered on the case in which all the functions are realized in the neural network management sections 1—1 and 1-2. Also, the pattern recognition apparatus 20 is assumed to be an image recognition apparatus below.

First, an example of operation of the neural network management sections 1-1, 1-2 is shown in FIG. 10. In FIG. 10, characters S1, S3, S4 and S6 to S11 attached to designate function modules working as a subroutine. The operation of each section in FIG. 1 will be explained below with reference to the flow of FIG. 10.

Upon the issue of a system start command (such as the turning on of a power supply), the neural network management sections 1—1, 1-2 execute the step S1 of initialization, in which a work area is secured and constants are set. When a start command is issued, it does not indicate any quitting, and therefore the step S3 of initial screen display setting is executed, followed by the step S4 of waiting for an input command. A display screen shown in FIG. 11 may be considered as an example of initial screen displayed in the initial screen display setting step S3. The upper part of the screen includes a command input column COL which is divided into a plurality of portions for displaying functions next executable such as editing, learning, associative output and quitting. The operator selects one of the functions by such means as the mouse. When the command input wait step S4 detects the complete selection of a given function by the operator, the neural network management sections 1—1, 1—2 shown in FIG. 1 execute each function module according to the functions selected as shown in the step S5 of FIG. 10. The operation of the system shown in FIG. 1 will be explained by reference to "edition", "learning" and "associative output" in that order.

Figure 11:
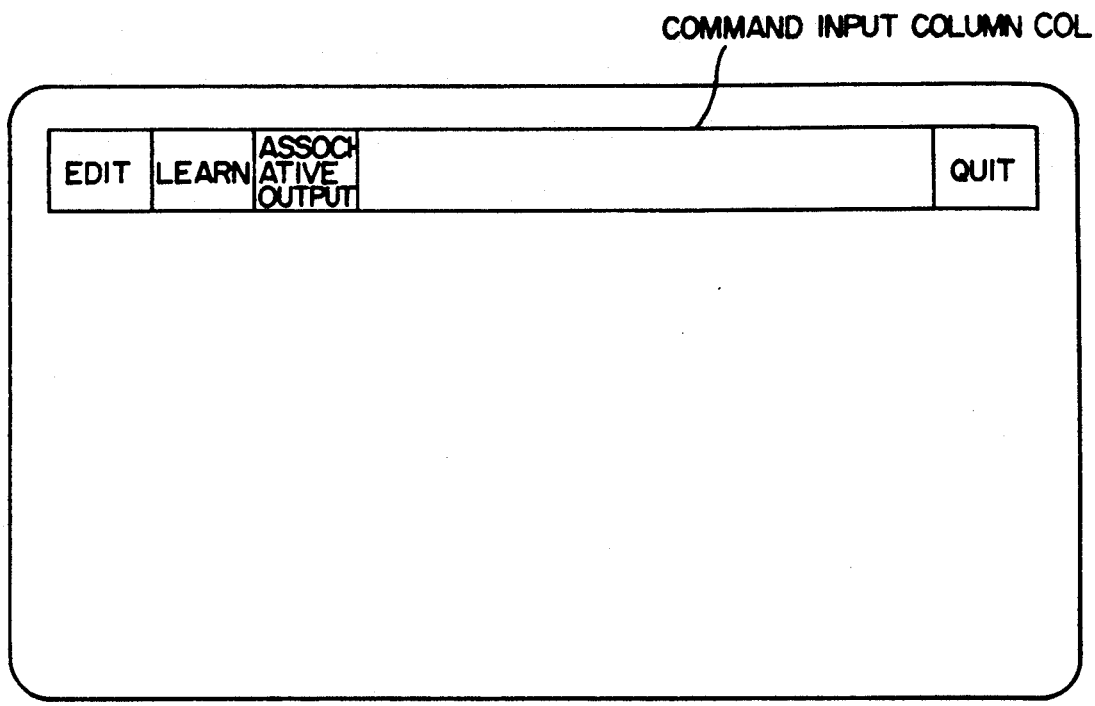
FIG. 11 is a diagram showing a screen at an initial stage of operation of an information processing means or system according to an embodiment of the present invention.
Figure 12:
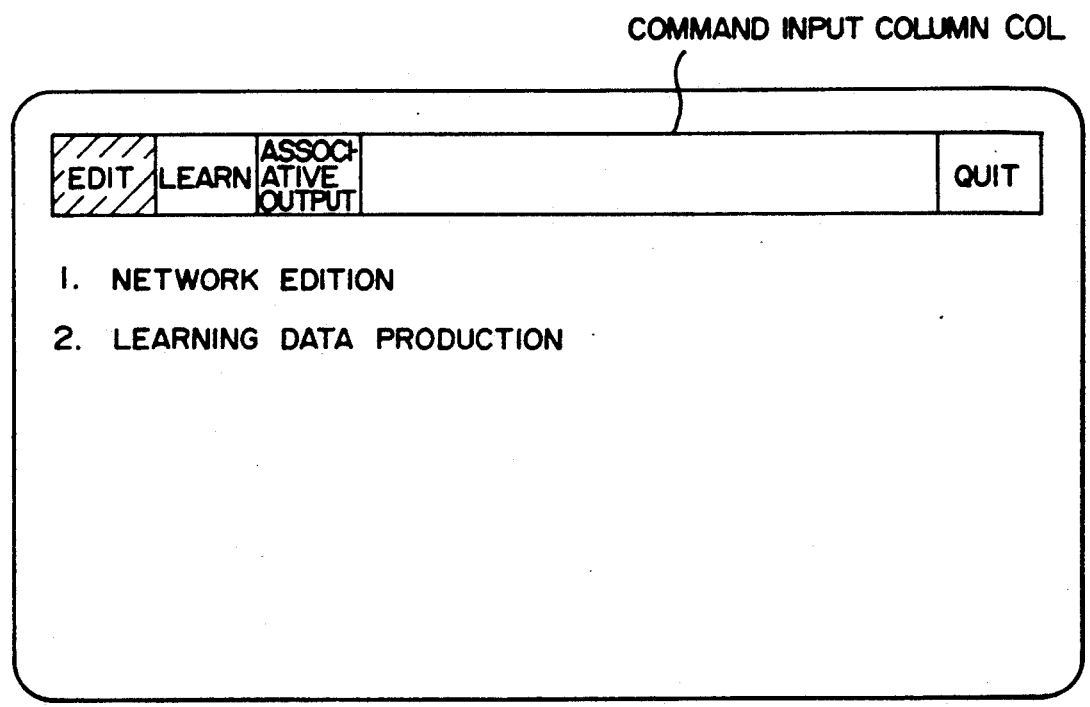
FIG. 12 is a diagram showing an initial screen in an edit mode of FIG. 11.

When "edition" is selected on the initial screen in FIG. 11, the neural network management sections 1—1, 1-2 execute the edition mode screen display step S6 and displays, for example, an edition mode screen such as shown in FIG. 12. In FIG. 12, in order to indicate that the edition function has been selected, the edition area hatched in the command input column COL is changed or reversed in black and white. The functions that can be executed in edition mode including (1) network edition and (2) production of the learning data are displayed at the same time. These functions are listed as generic ones required for constructing a neural network structure suitable for each application including the production of a learning data, and the present invention is not in the least limited to these functions. The underlying functions making up (1) network edition and (2) production of the learning data, may be displayed as they are.

The information on the neural network structure (such as the number of layers or the number of neurons for each layer) and the learning data defined by the "edition" are placed under the control of the neural network management sections 1-1, 1—2 and supplied to the learning section 2, the associative output section 3 and the communication interfaces 4-1, 4-2.

Figure 14:
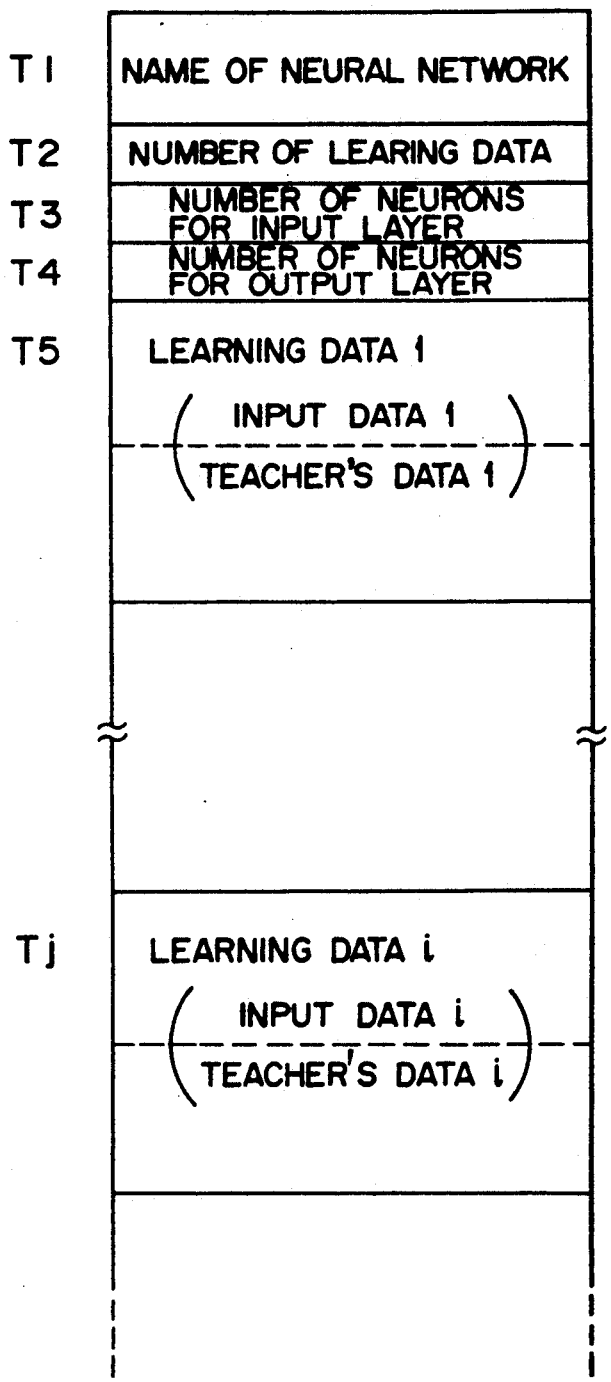
FIG. 14 is a diagram showing a format of a learning data usable according to the present invention.

An example of format of the learning data and information for defining the structure of this neural network may be as shown in FIGS. 13 and 14. FIG. 13 shows structure information of a neural network, in which C1 defines the name of a neural network having the structure as shown in FIG. 10 (with a name attached to the network). All the functions including "edition", "learning" and "associative output production" in the command input column COL of FIG. 11 are executed on this name of the neural network. C2 represents an area for defining the type of neural network to be constructed and designates Rumelhart (a multi-layered structure) or Hopfield type (a mutually connected structure).

C3 covers an area for setting an upper limit of the number of times of repetition of the learning operation by back-propagation. C4 and C5, on the other hand, designate areas for setting learning and stabilization constants used for back propagation corresponding to the learning constant $\eta$ and the stabilization constant $\alpha$ in an equation shown below representing an amount of correction $\Delta \angle ij^{N,N-1}$ of the weights between neurons described in "Neural Computer", by Kazuyuki Aihara, Tokyo Denki University Publishing Dept. Apr. 1988, p. 113.

$$\Delta \omega_{ij}^{N,N-1}(n+1) = \eta \delta_i^N x_i^{N-1} + \alpha \Delta \omega_{ij}^{N,N-1}(n) \quad (1)$$

$$\delta_i^N = f_f(u_i^N) \sum_k \delta^{N+1} \omega R_i^{N+1,N} \quad (2)$$

$$u_i^N \sum_j \omega_{ij}^{N,N-1} x_j^{N-1} + \theta_1^N \quad (3)$$

$$\delta_i^p = (t_i - O_i) f_f(u_i^p) \quad (4)$$

$$f(u_i^N) = 1/\{1 + \exp(-u_i^N)\} \quad (5)$$

In the equations (1) to (4) above, $\Delta \omega ij^{N,N-1}$ indicates the amount of correction of the weights of connection between the j-th neuron in the (N−1)th layer and the ith neuron in the N-th layer, $\delta_i^N$ a learning signal of the i-th neuron in the N-th layer, $xj^{N-1}$ an output data for the j-th neuron in the (N-1)th layer, $\delta_i^p$ a learning signal of the output layer, $t_i$ a teacher's data for the i-th neuron in the output layer, $O_i$ an output data of the i-th neuron in the output layer, $f_i$ an output function of neurons (Sigmoid function in equation (5)), $f_i'$ a differentiation Value thereof, and $\theta_1^N$ a threshold of the i-th neuron in the N-th layer.

Also, C6 in FIG. 13 represents an area for designating the manner of setting an initial value of weights between neurons and designates whether the weights set in C7 should be used as initial values of all the weights or whether they should be generated in random numbers. C8 covers an area for designating a threshold ($\theta_1^N$) in equation (3). Although the thresholds of all neurons are treated as coincident to each other above, the threshold of each neuron may be set independently of each other. C9 represents an area for setting a condition value for discriminating the convergence of learning of a neural network, and is used, for example, to decide that the learning has been converged when the square error between the teacher's data and the output data of the neural network or energy is reduced below a designated condition value. C10 to C19 indicate areas for designating the structure of a neural network in the form of the number of layers of the neural network and the number of neurons for each layer. If Rumelhart is designated as a type of network at C2, the first layer provides an input layer, the second and subsequent layers hidden layers, and the layer designated in number by C10, say, the third or fifth layer, makes up an output layer, with neurons connected only between the N-th and (N+1)th layers such as the first and second layers or the second and third layers. Assuming that Hopfield is designated as a network type, by contrast, connections are provided not only between neurons in different layers but between neurons in each layer.

FIG. 14 shows a table structure for managing the formats T5 to Tj of learning data and a plurality of leaning data. In FIG. 14, T1 represents an area for designating the name of the neural network which effects the learning. It is therefore necessary to define the structure of the particular neural network by the same neural network name with the format of FIG. 13. T2 designates an area for setting the number of the learning data included in the table shown in FIG. 13. The content of the learning data to be included and updating of the number the learning data are performed by the neural network management section 1—1. T3 and T4 designate areas for setting the number of neurons for the input and output layers of the neural network of Rumelhart type. These values are copied by the neural network management section 1—1 from the neural network structure information of FIG. 13. It is possible to determine the place of storage of the learning data i by use of the values of T3 (equal to the number of each input data) and T4 (equal to the number of each teacher's data).

A method of producing the neural network structure information of FIG. 13 and the learning data shown in FIG. 14 will be explained below.

First, reference is had to the sequence of producing the neural network structure information shown in FIG. 13. This information is produced by selecting and executing the function of "(1) network edition" in FIG. 12. The selection of the function of "(1) network edition" is effected by way of mouse or keyboard. Upon selection of this function, a screen such as shown in FIG. 15 is displayed. In FIG. 15, "(1) network edition" is displayed in the blank portion of the command input column to help grasp the environment of the hierarchically structured system to which the operator is exposed. In the process, the operator is inquired of the network name, input mode and print out. The network name to be edited is entered in the network name column. If "Keyboard" is selected in input mode, it is regarded as the production of a new network, and if "File" is selected, network information coincident with the name designated in the "Network name" column is searched for from among the network structure information recorded in the recording medium (hard disk, floppy disk, etc.) of the file. Also, when an external apparatus is selected in "Input mode", the network structure information is entered from another system having functions similar to those of the system shown in FIG. 1.

The print output of the network structure information edited may also be selected. It is also possible to display the network on the basis of the network structure information produced, if "Yes" is selected for network display.

In this way, "Run" is selected in the command column after setting the "Network name", "input mode", "Print output" and "network display". Each item of the network structure information shown in FIG. 13 is then displayed in the frame of FIG. 15, and if the data is set for each item, the contents thereof are also displayed. After that, each item may be corrected In the case where "Run" is selected in "Network display", the network may be displayed as shown in FIG. 16 on the basis of the network structure information input. Further, upon selection of an enlargement command, the portion designated by mouse, for example, may be displayed in an enlarged form (FIG. 16(b)), while at the same time making it possible to correct the weights between neurons and the thresholds of neurons. In FIG. 16(b), the layer number (i, i+1) of neurons and the number (k, j) in a layer are displayed.

When edition is complete, "Quit" may be selected to return to the initial display screen of edition mode shown in FIG. 12. In the process, the network structure information used for edition is printed out if "Yes" is selected in "print output".

Now, explanation will be made about the sequence of producing the learning data shown in FIG. 14. The learning data is produced by selecting "learning data production" in the initial display screen of edition mode shown in FIG. 12. In FIG. 1, however, the function of learning data production works only on the image recognition apparatus 20 side. The function of "Learning data production" is selectable by either mouse or keyboard. Upon selection of this function, the display screen shown in FIG. 17 is displayed, for example. Also in the screen of FIG. 17, as in the case of FIG. 15, "(2) Leaning data production" is displayed in the blank portion of the command input column to help grasp the environment to which the operator is exposed in a hierarchically structured system.

Figure 18A:
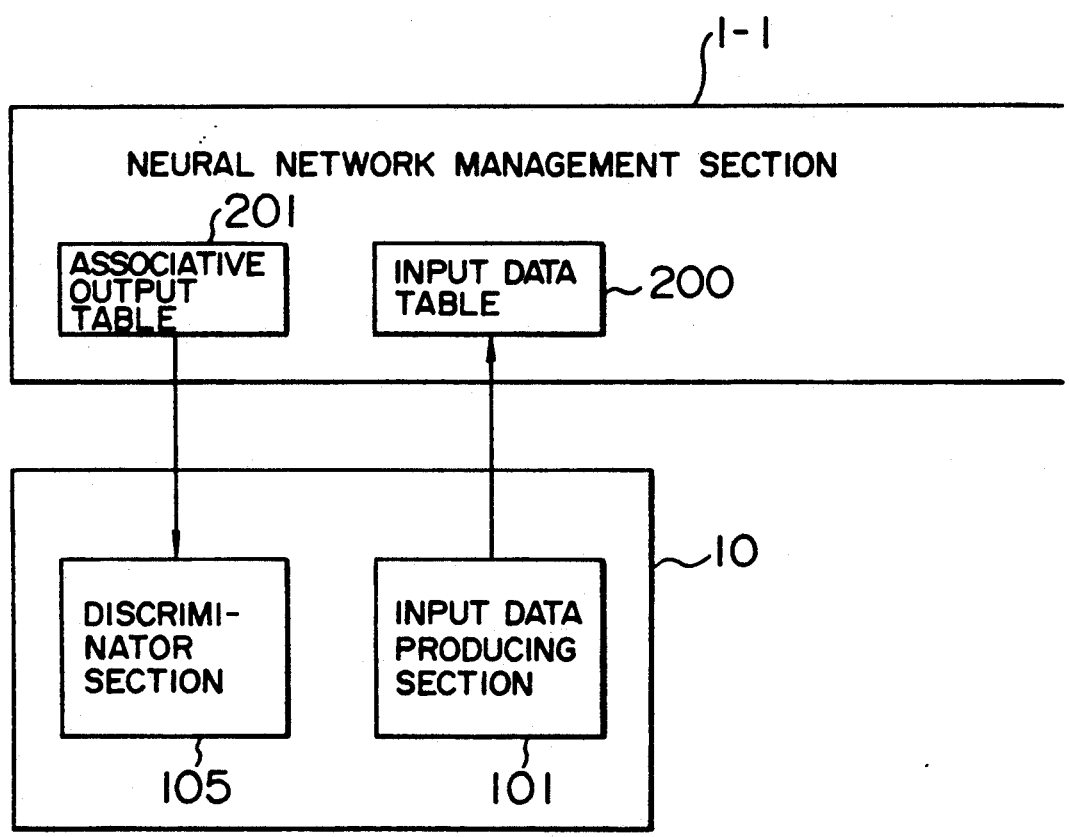
FIGS. 18a and 18b are diagrams showing a user application related to FIG. 17.

At the same time, the menu including "Name of neural network", "Input mode" and "Print output" is displayed to urge the operator to make entry. The name entered in the "Name of neural network" is required to be the one used for learning for which the network structure information has already been defined. In the next step, it is determined in "Input mode" whether the learning data (including input data and teacher's data) is produced by entry from keyboard or the learning data produced by the user application is entered. An example of learning data production by the user application (image processing in the present case) is shown in FIG. 18a. The various display processes described above with reference to FIGS. 11, 12 and 15 to 17 may be, for example, carried out by programs and/or graphic processors.

FIG. 18a is a diagram showing an example of a configuration of the user application 10 and a linkage of the user application 10 with the neural network management section 1—1. The neural network management section 1—1 includes, as interface means for linkage of the management section 1—1 with different applications, an input data table 200 and an associative output table 201 for storing associative outputs of the associative output section 3. The user application 10 generally includes an input data producing section 101 for producing input data and a discrimination section 105 for discriminating associative outputs of neural network means. The sections 101 and 105 are connected to the neural network management section 1—1 through the input table 200 and associative output table 201. The application 10 serves to store input data produced by the section 101 in the table 200 and to recognize an input pattern by reference to the table 201.

The input table 200 and the associative output table 201 are accessible from the learning data producing section 5 and the associative output section 3.

Considering image recognition as a user application, either of the following two methods is usable for general image recognition:

(1) A pattern matching method in which an image data of an object for recognition in two-dimensional arrangement is prepared, this reference pattern is compared with an input image, and the most analogous reference pattern is used as a result of recognition.

(2) A feature vector method in which features of an object for recognition (density frequency distribution, area, peripheral length, inclination, etc.) are extracted, a decision tree is mapped on the basis of these features in the space defined by feature vectors or recognition, the distance from the reference pattern is calculated, and the reference pattern with the minimum distance is used as the result of recognition.

Figure 18B:
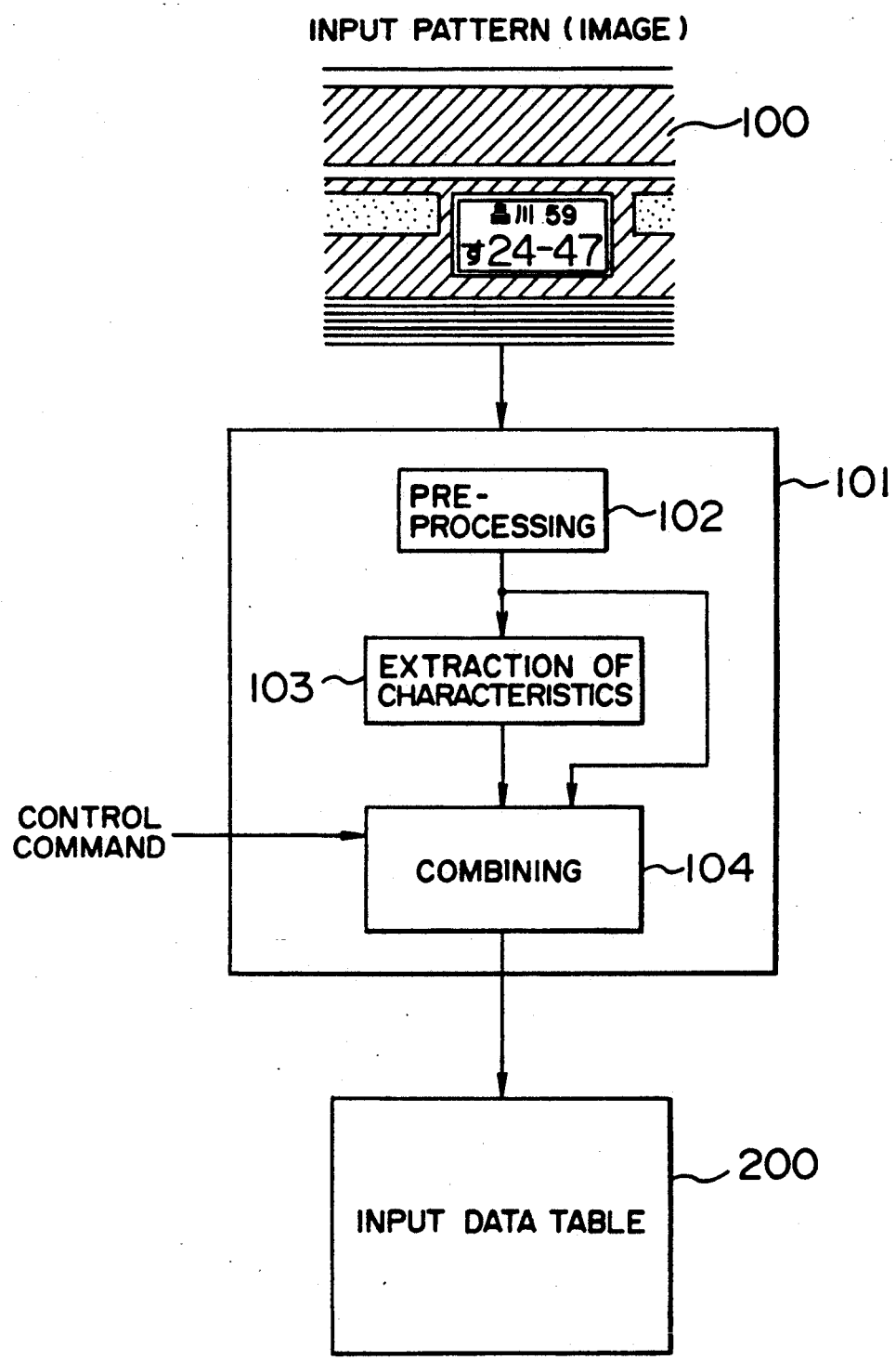

The neural network operates as a pattern matching system by application of a two-dimensionally arranged image data to the input neurons of the input layer, or as a feature vector system by application of features. Specifically, the neural network has dual recognition characteristic of pattern matching and feature vector systems. By taking advantage of this characteristic in such a manner as to apply a mixture data of two-dimensional image data and features to the neural network, therefore, recognition becomes possible by general decision with features and specific decision with image data. For this purpose, a learning data producing mechanism as shown in FIG. 18b is provided on the user application 10 in FIG. 1. In FIG. 18b, numeral 100 designates an input image containing an object for recognition (a numeral in the case under consideration), and numeral 101 an input data producing section. The input data producing section 101 includes an image preprocessing function 102, a feature extraction function 103 and a combining function 104.

The characteristic of this input data producing section 101 is the provision of the function of combining 104. Specifically, the input data is derived not only from the features extracted from the image data (binary image, density image) of the numerals selected at the preprocessing step 102 and the numeral but also from a data combination thereof. The input data thus produced is stored in the input data table 200 in the neural network management section 1—1 and delivered to the learning data producing section 5. In the learning data producing section 5, the teacher's data (supplied from the operator) is added to this input and registered as a learning data as shown in FIG. 14.

It is also possible to print out the learning data in a format shown in FIG. 14.

In this way, after setting each item of "Name of neural network", "Input mode" and "Print output", "Run" is selected in the command input column. Then, as shown in the frame at the center of the display screen in FIG. 17, the contents of the item defined in the learning data format of FIG. 14 is displayed. The name of neural network, the present number of learning data, the number of input layer neurons and the number of output layer neurons are displayed at the left part of the frame, while the contents and number of the learning data already produced and the input area for entering the learning data to be newly produced are indicated at the right part of the frame. These learning data may be scrolled vertically as desired to check the contents of the learning data of a given learning data number.

After completion of production of the learning data, when "Transfer" is selected in the command input column in FIG. 17, the learning data produced, together with the network name, the number of input layer neurons and the number of output neurons, are transferred to the computer system 30.

Figure 19:
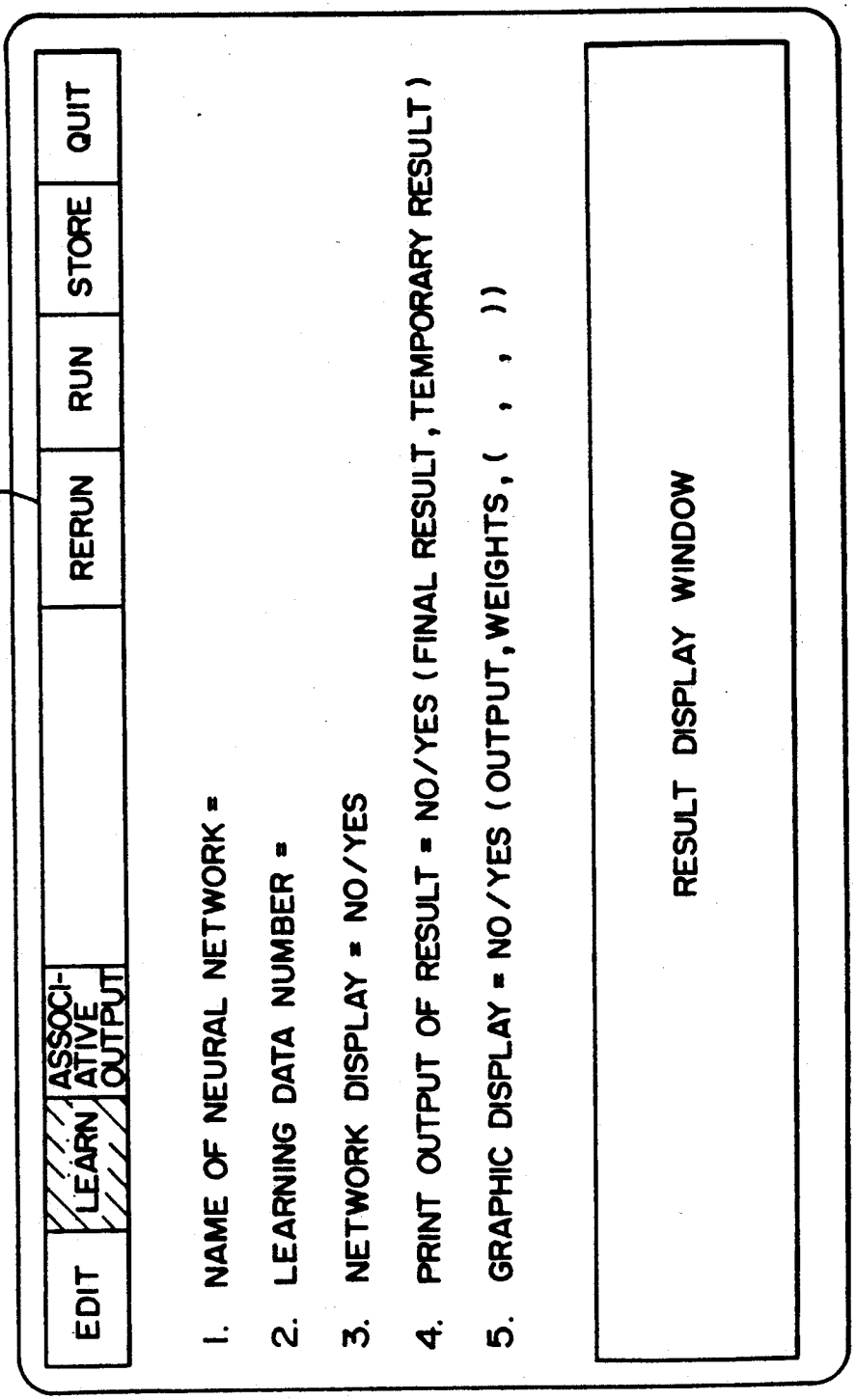
FIG. 19 is a diagram showing an initial screen in learning mode in FIG. 11.

Then, when "Learning" is selected on the initial display screen in FIG. 11, the network management sections 1—1, 1-2 execute the learning mode screen display processing step S8 thereby to display a screen as shown in FIG. 19, for example. If the name of the neural network for the learning and the number of the learning data are entered and "Run" or "Rerun" selected, the learning is executed. The number of learning data may be designated in a plurality of numbers. The difference between "Run" and "Rerun" commands lies in that one of the following modes is selected to switch the initial values of the weights between neurons of the neural network for the learning:

(1) "Run": This mode uses an initial value set in accordance with the method of setting initial weights designated by the neural network edition.

(2) "Rerun": The weights corrected by learning at "run" or "Rerun" are used as initial values.

The "run" command permits comparison and evaluation (in recognition rate, learning time, etc.) of neural networks with the conditions such as the learning constant ($\theta$) and the stabilization constant ($\alpha$) changed for same weights.

Also, it is possible to control the display of the neural network and the graphic presentation of changes in the print output and weights after learning The neural network may be displayed as shown in FIG. 16 by color or density in accordance with the degree of excitation or the value of weights of neurons. Also, the neurons and the connecting lines between neurons associated with a large degree of excitement or weights of neurons are displayed by blinking. These may be achieved by programs, or by hardware functions of a graphic processor used for displaying the neural network.

When "Store" in the command input column is selected, the weights of the neural network for which the learning is complete are stored in file, while at the same time being transferred to the image recognition apparatus 20. Upon selection of "Quit", on the other hand, the "Learning mode is completed and the process is returned to the initial display screen of FIG. 11.

As the last step, when "Associative output" in the command input column is selected on the initial display screen shown in FIG. 11, the network management sections 1—1, 1-2 execute the asociative output mode screen display processing step S10, thus displaying a screen such as shown in FIG. 20, for instance. At the time of execution of "Associative output", however, it is necessary that the weights of the neural network have been transferred to the associative output section 3 of the pattern recognition apparatus 20 from the learning section 2 of the computer system 30.

The name of the neural network used for associative output is selected, followed by determination as to whether the input data for the neural network is produced at the user application or the input data in the learning data already produced is used in "Mode". After that, upon selection of "Run" in the command input column, the associative output is produced by use of the input data designated in "Mode", so that the associative output is displayed in the "Result display window" column. In the process, if "Yes" is selected in "Print output result", the associative output is printed out while being displayed on the screen. Also, in the case where "Yes" is selected in "Network display", the neural network is displayed as shown in FIG. 16, by color or density in accordance with the degree of excitement of neurons as well as by blinking, like in the learning.

According to the present embodiment, it is possible to readily configure a learning environment adapted for constructing and evaluating a neural network with a satisfactory interaction maintained between operator and system on the one hand and a practical system permitting visual confirmation of the result of associative output on the other hand.

Figure 21:
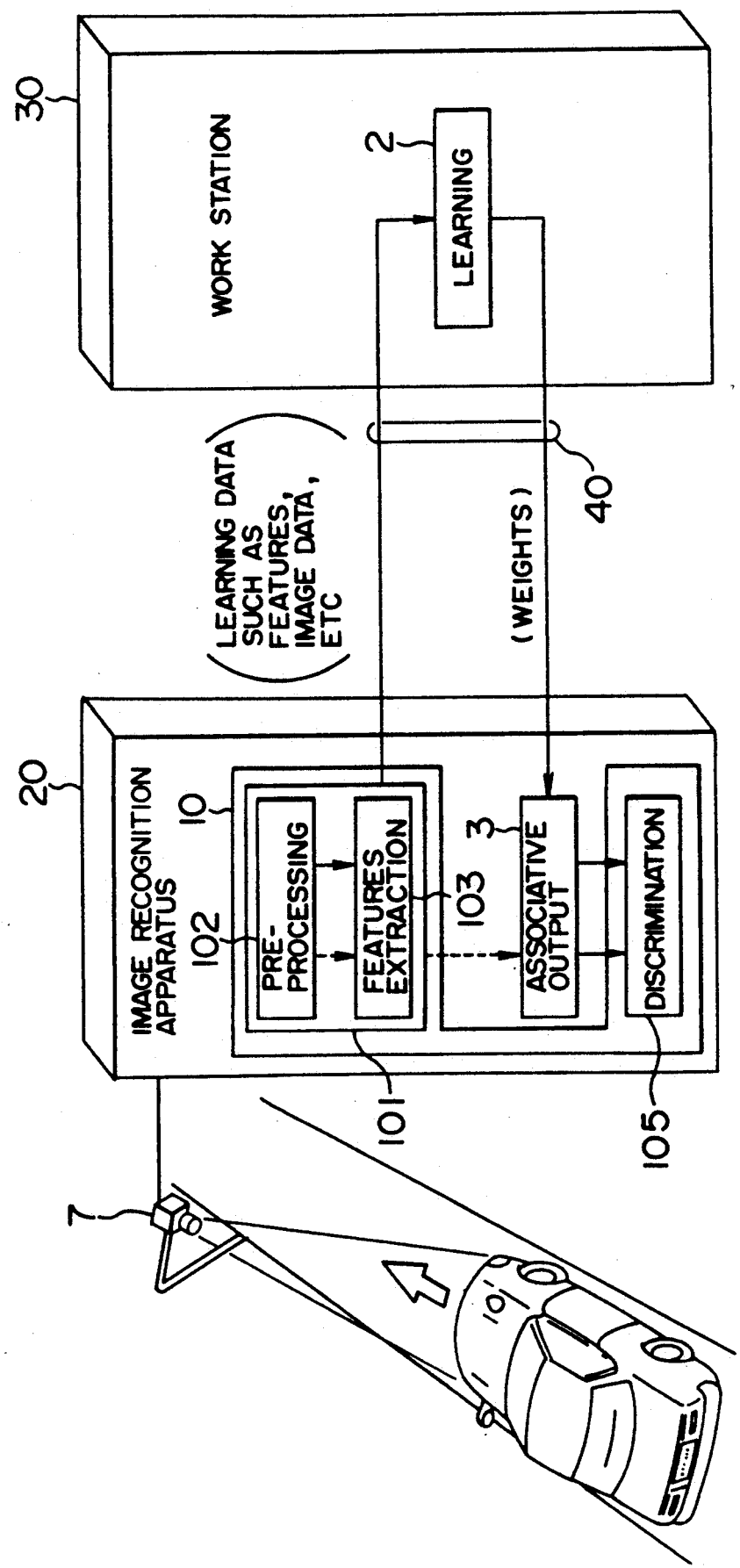
FIG. 21 is a diagram showing a system configuration of the present invention as applied to the recognition of the registration number of an automobile.

A configuration of an automotive registration number recognition system is shown in FIG. 21 as an application of the present embodiment. In FIG. 21, numeral 20 designates an image recognition apparatus, numeral 30 a work station, numeral 7 a TV camera, and numeral 10 a user application for recognizing an automotive registration number. The user application 10 is comprised of three means including a pre-processing step 102, a feature extraction step 103 and a decision step 105. The processing in the system shown in FIG. 21 is executed in two phases. First, the learning phase in the neural network follows the processing route indicated by a solid arrow →, and the operation phase for processing the recognition of an automotive registration number on line is executed along a dotted arrow →.

In the learning phase, an image photographed by the TV camera 7 is subjected to the pre-processing step 102 and the feature extraction 103 in the user application 10, selecting the registration number from the registration number plate and extracting the features of the particular registration number. These features, as a learning data, are transferred to the work station 30 through the communication cable 40. The teacher's data in the learning data may be supplied by an operator via a keyboard, for example. The work station 30 executes the learning 2 by use of the learning data sent thereto. Upon completion of the learning, the weights are transferred to the image recognition apparatus 20.

As the next step, the operation phase separates the work station 30, so that the image recognition apparatus 20 operates independently in the manner mentioned below. The image taken by the TV camera 7 is processed at the user application 10 to extract the features of the registration number. The features thus extracted are stored in the input data table 200 shown in FIG. 18a and delivered to the associative output section 3. The associative output section 3 produces an associative output on the basis of the weights transferred thereto beforehand, and stores the output values of output neurons in the associative output table 201.

Figure 22:
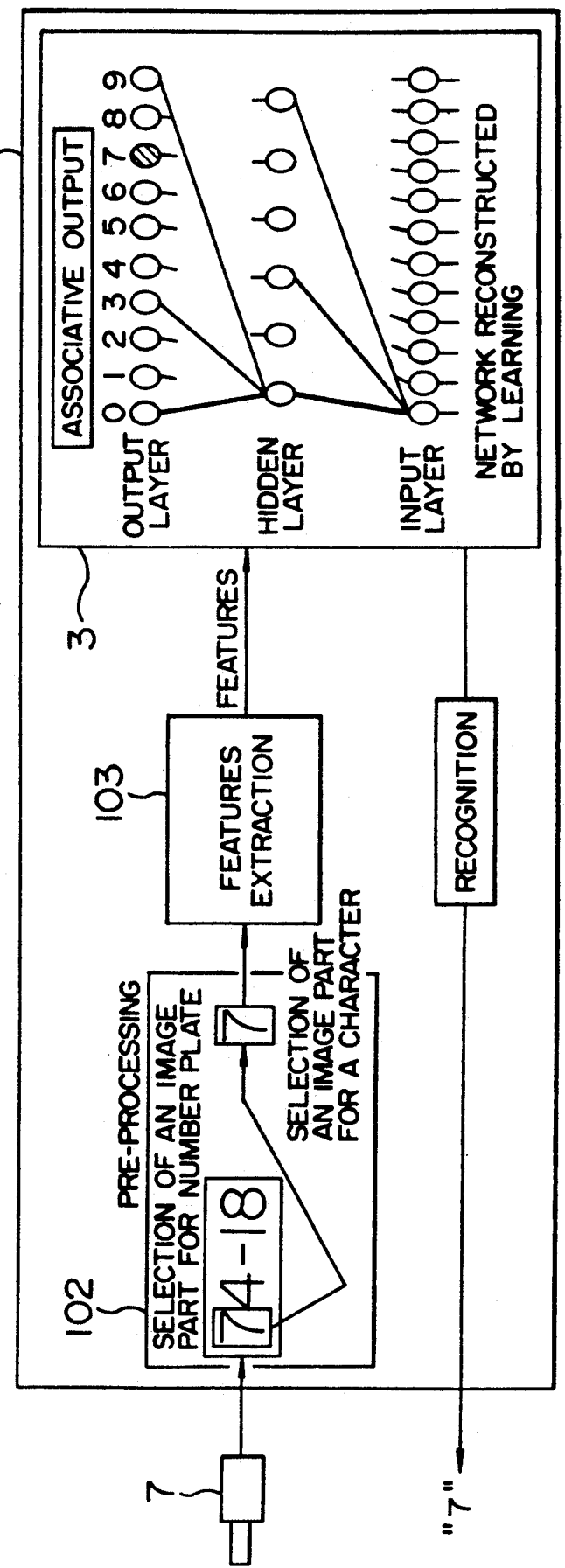
FIG. 22 is a diagram showing the manner in which the number "7" is subjected to an associative output operation in the system of FIG. 21.

The discriminator section 105 detects a neuron that has produced the largest output value for each input pattern with reference to an associative output table and determines a corresponding category ('0' to '9' in the present example). This procedure is shown in FIG. 22 representing a situation at a time point when the associative output 3 is produced with the features extracted from the image of the number '7' in the registration number plate by use of a network including three layers of input, hidden and output layers, following the learning at the particular neural network. Under this condition, the neurons of the output layer '7' are excited producing a maximum output value.

According to the system shown in FIG. 21, in view of using the features extracted from an automotive registration number as an object for recognition, the number of neurons making up the neural network is reduced as compared with when the image data of a registration number in two-dimensional arrangement (binary image data or density image data) is used as a learning data, thus improving the speed of learning and associative output.

The use of a two-dimensional image data as a learning data, though the time of learning and associative output production is lengthened, eliminates the need of determining the specific nature of the features mentioned above. A configuration may therefore be proposed, in which the image data (binary image data or density image data) selected at the pre-processing step 103 of the learning data production section 5 in the system of FIG. 21 may be used as a learning data.

According to the present embodiment, the pattern recognition apparatus is capable of producing a learning data and an associative output using a neural network, while the computer system has an ability to learn the neural network, with the pattern recognition apparatus connected with the computer system by means of a communication cable, thereby realizing both a neural network high in learning speed and a practical, low-cost pattern recognition system using such a neural network.

Now, explanation will be made about an embodiment of the present invention applied to an apparatus for checking the perfection or imperfection of a finished product or the like by image.

A conventional apparatus for checking the perfection or imperfection of a product or the like automatically by product image requires development of an inspection algorithm for each object for inspection. In the case of a printer, for example, the quality (presence or absence of a deffect such as smear, blur or the like) of printed characters is evaluated to check the finish by means of an inspection algorithm prepared for each type of printer inspected. This is by reason of the fact that, specifically, in the conventional method using an image processing technique, candidates of smear, blur and the like are emphasized in the image pre-processing step by convolution as or the like, followed by extracting features such as the area and peripheral length to determine a fault. Different models of the ink jet printer, laser beam printer and the like, on the other hand, have different character fonts with different character types printed. Since the type and size of features used for determining a fault vary with character, the above-mentioned method of determining a fault by features is not applicable to all the different models uniformly. This has necessitated an algorithm for checking the print quality in order to detect such a fault as smear or blur exclusively for each model of printer.

A technique for a quality inspection of characters in a simple way by use of pattern matching is disclosed in JP-A-63-304381 (laid-open on Dec. 12, 1988) entitled "Image Pattern Inspection Apparatus". This technique has an advantage in that since characters of different character fonts are allowed to be subjected to the quality inspection, it is not necessary to develop an inspection algorithm for each model of the inspection apparatuses. In spite of this, it is necessary to provide a character font for each model as a dictionary pattern for pattern matching.

The problem of the conventional apparatus lies in that different inspection algorithms are required to be developed to meet different objects for inspection, thus requiring great development efforts.

According to the present embodiment, there is provided an image inspection apparatus which is capable of conducting an inspection with the same technique for different objects for inspection and therefore no great efforts are required for developing an inspection algorithm.

The present embodiment is intended to detect a fault of an object by use of a layered neural network. In order to realize this, the present embodiment comprises an image input section such as ITV for grasping an object as an image, an image processing section for extracting a character or other object of inspection rom an image produced at the image input section, a neuro-learning section supplied with an image data produced at the image processing section as a learning data for a neural network to determine the connection (weights) of the network by learning, a neuro-associative output section for constructing a neural network on the basis of the weights determined at the neuro-learning section and applying an object image data to the neural network to produce an associative output, and a discriminator section for determining the perfection or imperfection of the object for inspection on the basis of the result of associative output produced at the neuro-associative output section The neuro-learning section causes the neural network to learn only by use of a conforming image information as learning data. The neural network thus constructed responds with maximum output to a conforming image information. The neuro-associative output section reproduces this neural network internally and produces an associative output in response to image information providing an object for inspection applied thereto. In the process, if the image information is similar to the conforming one (input data) used for learning, the output of the neural network approaches a maximum value. In the case where the discriminating section decides that the image information just applied is different from a conforming image information used as a learning data by more than a tolerable range due to a scratch, smear, blur or the like, the neural network produces a low output. In such a case, the discriminating section may decide a fault, or that the object for inspection is imperfect.

The aforementioned operation of the neural network permits decision on the perfection or imperfection of an object (product or the like). Also, different objects for inspection are met by causing the neural network of the neuro-learning section to learn from the image information on a new conforming object as a learning data, thereby saving the labor for developing a new inspection algorithm.

Figure 23:
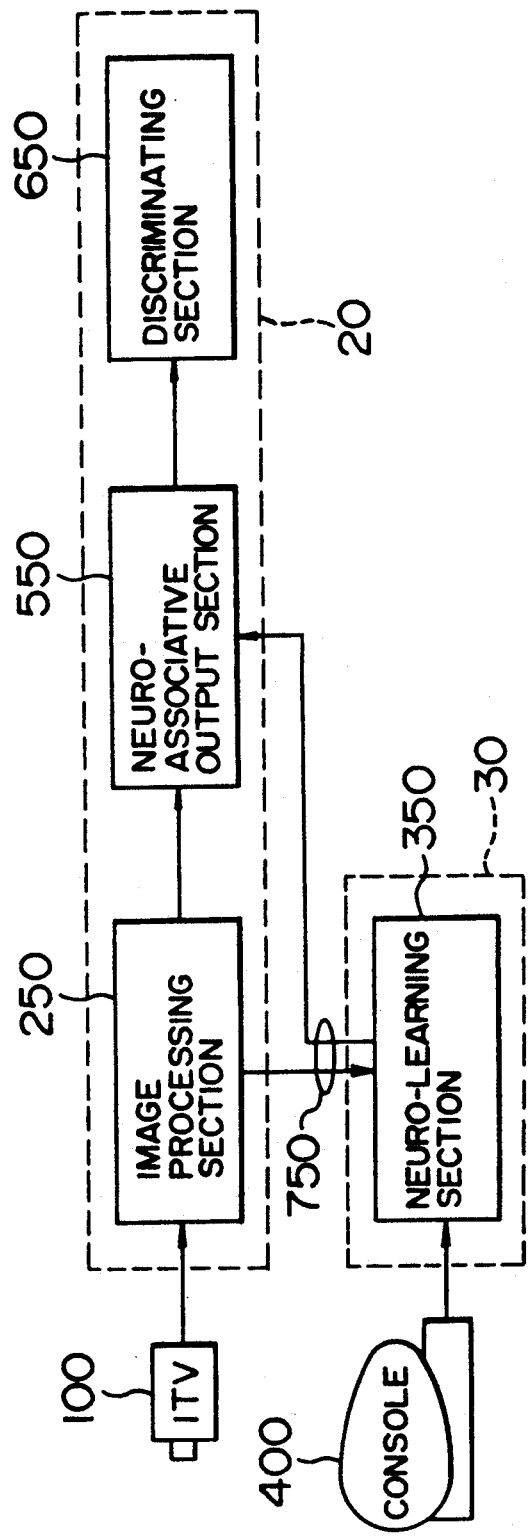
FIG. 23 is a diagram showing a block configuration of a character quality inspection system according to an embodiment of the present invention.

Now, this embodiment will be explained with reference to FIG. 23. This diagram shows a character quality inspection apparatus for determining the perfection or imperfection by detecting the presence or absence of smear, scratch or the like of printed numerals "0" to "9". In FIG. 23, an ITV 150 is an image input unit for grasping an object for inspection as an image. An image processing section 250 conducts various pre-processing operations such as convolutions, addition or subtraction between images and binarization on the image applied to the ITV 150 to select a character intended for inspection, and transfers the selected character to the neuro-learning section 350 as a learning data through a communication cable 750 by a communication interface (not shown) included in the section 250. The neuro-learning section 300 receives this learning data through a communication interface included therein (not shown), and conducts the learning for determining the connection (weights) of the layered neural network included therein A console 450 provides a teacher's data specifically identifying the learning input data in conducting the learning at the neuro-learning section 350. When a numeric character "4" is presented as a learning input data, for example, the operator enters the identification of "4" as a teacher's data by way of the console.

The neuro-associative output section 550 uses the character selected at the image processing section 250 to produce an associative output at the layered neural network included therein, for example. This layered neural network has the same configuration as the neuro-learning section 350. The weights $w_{ij}$ for network reconstruction produced by learning at the neuro-learning section 350 are transferred to the neuro-associative output section 550 through the communication cable 750 by the communication interface of the learning section 350. The neuro-associative output section 550 receives the weight data by the communication interface included therein (not shown) thereby to construct the final network. The discriminator section 650 decides the perfection or imperfection of the character making up an object for inspection on the basis of the associative output of the neuro-associative output section (the value of the output neuron from the output layer of the layered neural network).

The above-mentioned operation of the character quality inspection apparatus comprises the processings of (1) the learning and (2) the associative output production. These processings will be explained below.

Figure 24C:
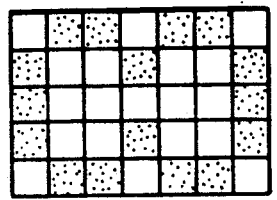
FIGS. 24a, 24b and 24c are diagrams for explaining examples of object for recognition in FIG. 23.
Figure 24B:
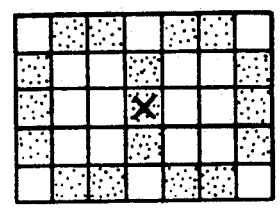
Figure 24A:
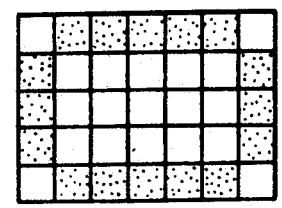

(1) Learning: The learning of a layered neural network is executed in the neuro-learning section 350. In this case, the operation is performed mainly by the ITV 150, the image processing section 250, the neurolearning section 350 and the console 450. First, the neuro-learning section 350 is supplied with a learning input data and a teacher's data. The learning input data includes only conforming characters making up an object for inspection in the form of image data. Specifically, an image of a conforming character supplied from the ITV 150 is pre-processed at the image processing section 250 to extract a numeric character to be inspected. According to the present embodiment, as shown in FIGS. 24a, 24b (FIG. 24a shows a conforming numeric character "0", and FIG. 24b a conforming numeric character "8"), a black-and-white image data including five rows of pixels in vertical direction and seven columns of pixels in lateral direction is assumed. The teacher's data, on the other hand, is entered by the operator by way of the console 400 on the basis of the learning data of the characters extracted.

The layered network included in the neurolearning section 350 may be configured as shown in FIG. 2. The input layer 351 has 35 neurons corresponding to the number ($=5\times7$) of pixels of the learning data, the hidden layer 352 eighteen neurons, and the output layer 353 ten neurons corresponding to the number of numeric characters to be inspected ("0" to "9"). The number of neurons of the hidden layer is not limitative, but experiences show that a satisfactory result will be obtained if it is about one half of the number of neurons in the input layer. The teacher's data mentioned above is such that one of the neurons provided in the output layer 353 for the numeric characters 0 to 9 is caused to output "1" in accordance with a corresponding numeric character and the remaining neurons are caused to output "0". The neuro-learning section 350, which has the input layer neurons of the layered neural network supplied with the learning input data from the image processing section 250, executes the learning by back-propagation using the teacher's data entered from the console as an error function. The learning is repeated until the network converges for all types of numerals (conforming products). The weights $w_{ij}$ of neurons of each layer determined after convergence are transferred to the neuro-associative output section 550 through the communication cable 750. The neuro-associative output section 550 constructs therein a layered neural network by the weights $w_{ij}$ transferred thereto.

(b) Associate output production: This is a process for producing an associative output of the layered neural network in the neuro-associative output section 550 to decide the perfection or imperfection of an actual character to be inspected. This operation is performed mainly by the ITV 150, the image processing section 250, the neuro-associative output section 550 and the discriminator section 650. First, the neuro-associative output section 550 is supplied with an associative output data (pattern input data). This associative output data is an actual character to be inspected extracted in the same manner as the learning data in the learning step, and like the learning input data of the learning data, makes up a black-and-white image data consisting of five lateral rows of pixels and seven vertical columns of pixels. The result of associative output of the layered neural network for this associative output data is an assembly of output values of ten neurons of the output layer 353 in the network under consideration. If the associative output data (pattern input data) represents a pattern substantially similar to the learning data (that is, associated with a satisfactory product), for instance, the output value of corresponding one of the ten neurons of the output layer approaches "1", while the output values of the remaining nine neurons become close to "0". If the associative output data has a pattern somewhat different from the learning data (that is, associated with an imperfect product having a scratch, blur or other fault), on the other hand, the output value of a corresponding neuron is reduced as compared with that of a perfect product, and at least one of the remaining nine neurons produces a large output value. In the case of the associative output data of "8" in FIG. 24c lacking a pixel x by blur as compared with the perfect product of the neural "8" in FIG. 24b, for example, the output value of the neuron corresponding to "8" is reduced to 0.8 (about 0.99 for a perfect product), while the output value of the neuron at least corresponding to "0" increases to 0.3 (about 0.01 for a perfect product). This is by reason of the fact that the blur causes the pattern of "8" (FIG. 24b) to come to somewhat resemble that of "0" (FIG. 24a). With this as a motive, the output values of the remaining neurons are also increased to some degree.

The discriminator section 650 decides whether the character print is satisfactory or not on the basis of the result of associative output. A method of this decision will be explained with reference to FIG. 24. First, a maximum value $O_{max}$ is detected from an assembly of output values of ten neurons (output layer) resulting from the above-mentioned associative output (step 610). The maximum value $O_{max}$ detected is compared with a threshold TH1 (step 620). The threshold TH1 is set in advance in the present system, and a specific value thereof depends on the target accuracy or the like, an empirical value being about 0.9. If step 620 decides that the maximum value $O_{max}$ is less than the threshold TH1, it is decided that the associative output data for the printed character providing an object for inspection is unconditionally imperfect, so that the discriminator section 600 produces a decision result of "Imperfect" (step 670). If the maximum value $O_{max}$ is not less than the threshold TH1, by contrast, the associative output data for the printed character making up an object for inspection is determined to be a candidate for a conforming product, so that the second value $O_{sec}$ following the maximum value $O_{max}$ is detected from among the assembly of output values of the ten output layer neurons (step 630). Then the ratio (or difference) R between $O_{max}$ and $O_{sec}$ is determined (step 640). The threshold TH2 (specifically, about 100 obtained by experiences) set in the system beforehand is compared with the ratio R (step 650), and if the ratio (or difference) R is equal to or more than the threshold TH2, it is decided that the associative output data for the printed character making up the present object for inspection is conforming thereby to produce a decision result "Perfect" at the discriminator section 600 (step 660). If the comparison shows that the ratio (or difference) R is less than the threshold TH2, by contrast, it is decided that the associative output data for the printed character providing the present object for inspection is non-conforming, and a decision result "Imperfect" is produced by the discriminator section (step 660). This decision is made for each of the objects for inspection. The discriminator section 650 may be configured of a combination of a plurality of logic circuits or a microprocessor operated by a program for executing the above-mentioned sequence of processings.

The character quality inspection apparatus according to the present embodiment has the following advantages:

(1) Even when the character fonts to be inspected are different, the difference is met by new learning of the layered neural network and changing the combination (weights) of the network, thus saving the labor for developing a new inspection algorithm.

(2) In constructing a network by leaning, various different patterns of non-conforming products are not required, but only a pattern of a conforming product is used as a learning data, thereby reducing the number of for learning data. As a result, the processing time required for learning is also reduced.

(3) the decision as to the perfection or imperfection based on the associative output of the neural network uses not only the maximum value of neuron output but the second largest output value, and therefore the inspection accuracy is improved.

(4) By dividing the operating section of the neural network into a neuro-learning section (for executing the learning process exclusively) and a neuro-associative output section (for producing an associative output exclusively) as shown in FIG. 1 in accordance with the functions, the neuro-learning section may be separated to permit inspection only with the neuro-associative output section at the time of character quality inspection (in on-line fashion), thereby reducing the size of the system for on-line inspection.

We claim:

1. An information processing system using a neutral network learning function, comprising:

first operating means including learning data producing means for producing learning data for a neural network and associative output means having a first neural network for producing, after having been reconstructed on the basis of the learning data, output data responsive to given input data;

communication medium means; and second operating means coupled to said first operating means by said communication medium means and including learning means supplied by said communication means with the learning data produced by said learning data producing means and having a second neural network for executing learning with the learning data to generate connection weight data to be supplied, via said communication medium means, from said second operating means to said first operating means so that reconstruction of said first neural network is effected with supplied connection weight data.

2. A pattern recognition system using a neural network learning function, comprising:

a pattern recognition apparatus including learning data producing means for producing learning data for a neural network and associative output means having a first neural network for producing, after having been reconstructed on the basis of the learning data, output data responsive to given input data;

communication medium means; and operating means coupled to said pattern recognition apparatus by said communication medium means and including learning means, said learning means having a second neural network for executing learning by use of learning data produced by said learning data producing means to generate connection weight data, the learning data being supplied, via said communication medium means, from said pattern recognition apparatus to said operating means, and said connection weight data being supplied, via said communication medium means, from said operating means to said pattern recognition apparatus so that reconstruction of said first neural network is effected with supplied connection weight data.

3. A pattern recognition system according to claim 2, wherein said pattern recognition apparatus includes means for supplying structure information on the neural network, in addition to the learning data, to the operating means via said communication medium means for executing the learning by the second neural network.

4. A pattern recognition system according to claim 2, wherein said operating means includes the learning means and another associative output means.

5. An image recognition system using the neural network learning function, comprising:

an image recognition apparatus including learning data producing means for producing learning data for a neural network and associative output means having a first neural network for producing, after having been reconstructed on the basis of the learning data, output data responsive to given input data;

communication medium means; and operating means coupled to said image recognition apparatus by said communication medium means and including learning means, said learning means having a second neural network for executing learning by use of learning data produced by said learning data producing means to generate connection weight data, the learning data being supplied via said communication medium means from said image recognition apparatus to said operating means, and said connection weight data being supplied via said communication medium means from said operating means to said image recognition apparatus so that reconstruction of said first neural network is effected with the supplied connection weight data.

6. An image recognition system according to claim 5, wherein the learning data producing means of the image recognition apparatus includes means for producing the learning data on the basis of image data of an object for recognition or features extracted from the object for recognition or both.

7. An image recognition system using a neural network according to claim 5, further comprising first display means for displaying a configuration of the neural network used for a selected one of the learning and the associative output.

8. An image recognition system according to claim 7, further comprising enlarged display means for displaying in enlarged form a predetermined portion of the configuration of a neural network displayed by the first display means, and correcting means for executing at least a selected one of the correction of the threshold of neurons for the neural network displayed in enlarged form, the correction of the weights between neurons and the disconnection of neurons.

9. An image recognition system according to claim 7, wherein the first display means includes a selected one of means for displaying a selected one of the color and brightness changed in accordance with the degree of excitement of neurons and blink display means for displaying by blinking neurons high in the degree of excitement.

10. An image recognition system according to claim 5, wherein said image recognition apparatus includes a user application having input data producing means for producing input data and discriminating means for making discrimination by use of the result of the associative output from the associative output means, and interface means permitting the user application to be connected with the learning data producing means and the associative output means.

11. An image recognition system according to claim 10, wherein said interface means is common table means.

12. An image recognition system according to claim 10, further comprising:
   image pick-up means for picking up an image of an automobile including a registration number plate and supplied with the particular image; and
   pre-processing means for extracting the registration number plate from the image supplied from the image pick-up means and selecting the registration number of the number plate thus extracted and feature extracting means for extracting the features from the registration number selected by the pre-processing means, said pre-processing means and said feature extracting means being included in the user application;
   wherein the learning means learns from the features extracted from the feature extracting means, and the associative output means produces an associative output by use of the features extracted.

13. An image recognition system according to claim 10, further comprising:
   image pick-up means for picking up an image of an automobile including a registration number plate and supplied with the particular image; and
   pre-processing means in the user application for extracting the registration number plate from the image supplied from the image pick-up means and selecting the registration number from the number plate thus extracted;
   wherein the learning means learns from the data of the registration number selected by the preprocessing means, and the associative output means produces an associative output by use of the data of the registration number thus selected.

14. A pattern recognition apparatus using a neural network learning function, comprising:
   an input signal source section for supplying at least one of a learning input signal and a pattern input signal representative of a pattern to be recognized;
   a communication medium;
   a learning section associated with said input signal source section via said communication medium for receiving data concerning the learning input signal, said learning section including first neural network means and weight adjusting means coupled to said first neural network means for adjusting weights of connections in said first neural network means so as to minimize the difference between an output of said first neural network means in response to received data concerning the learning input signal and a teacher's data signal;
   an associative output section including second neural network means and associated with said learning section via said communication medium for receiving therefrom the adjusted weight data to for incorporation thereof into said second neural network means, said associative output section being coupled to said input signal source section for receiving therefrom the pattern input signal so that said associative output section having the adjusted weight data incorporated thereinto produces an associative output signal in response to the pattern input signal, said communication medium associating said learning section with said associative output section being arranged such that they are electrically isolated from each other when said associative output section is in operation for producing the associative output; and
   a discriminator section coupled to said associative output section for determining whether the associative output signal represents the pattern input signal or not.

15. A pattern recognition apparatus according to claim 14, further comprising a learning data producing section coupled to said input signal source section for receiving the learning input signal therefrom and for producing a learning data signal by combining the learning input signal with the teacher's data signal, said learning section being associated with said input signal source section by way of said learning data producing section via said communication medium for receiving the learning data signal.

16. A pattern recognition apparatus according to claim 14, further comprising means for supplying a teacher's data signal to said learning section.

17. An information processing system comprising:
   a communication line;
   a function defining apparatus connected through a first communication interface with said communication line, said function defining apparatus including a learning section having first neural network means and weight adjusting means coupled to said first neural network means for adjusting weights of connections in said first neural network means so as to minimize the difference between an output of said first neural network means in response to a learning input signal and a teacher's data means in response to a learning input signal and a teacher's data signal; and
   a plurality of information processing apparatuses each connected with said communication line through a second communication interface, each of said information processing apparatuses including a learning data producing section for producing a learning data signal containing the learning input signal and the teacher's data signal, the learning data signal being transferred by said second communication interface to said learning section via said communication line and said first communication interface, and each of said information processing apparatuses further including an associative output section having second neural network means and being operable to receive the data on the adjusted weights to incorporate them into said second neural network means, the data on the adjusted weights being transferred by said first communication interface to said associative output section via said communication line and said second communication interface, said associative output section being coupled to an input signal source for receiving therefrom a pattern input signal representative of a pattern to be recognized so that said associative output section having the adjusted weight data incorporated thereinto produces an associative output in response to the pattern input signal.

* * * * *